(12) United States Patent
Waterhouse et al.

(10) Patent No.: US 7,299,325 B1
(45) Date of Patent: Nov. 20, 2007

(54) METHOD OF GARBAGE COLLECTION ON A DATA STORAGE SYSTEM

(75) Inventors: Steven Richard Waterhouse, San Francisco, CA (US); Sherif M. Botros, Redwood Shores, CA (US); Olaf Manczak, Hayward, CA (US); Patrick Gates, San Francisco, CA (US); Jeremy Werner, San Francisco, CA (US); Sacha Arnoud, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 284 days.

(21) Appl. No.: 11/212,093

(22) Filed: Aug. 24, 2005

Related U.S. Application Data

(63) Continuation-in-part of application No. 10/883,299, filed on Jun. 30, 2004.

(51) Int. Cl.
*G06F 12/00* (2006.01)

(52) U.S. Cl. .................. 711/159; 711/133; 711/205; 711/221; 707/206

(58) Field of Classification Search ............ 711/159, 711/133, 205, 221; 707/206
See application file for complete search history.

(56) References Cited

U.S. PATENT DOCUMENTS

| | | | |
|---|---|---|---|
| 5,640,286 A | 6/1997 | Acosta et al. ............. 360/48 |
| 5,689,727 A | 11/1997 | Bonke et al. ............. 710/20 |
| 6,108,703 A | 8/2000 | Leighton et al. ......... 709/226 |
| 6,182,121 B1 | 1/2001 | Wlaschin ................ 709/215 |
| 6,295,564 B1 | 9/2001 | Shigetomi et al. .......... 710/74 |
| 6,496,883 B2 | 12/2002 | Shigetomi et al. .......... 710/74 |
| 6,557,076 B1 | 4/2003 | Copeland et al. ......... 711/744 |
| 6,567,905 B2* | 5/2003 | Otis ...................... 711/170 |
| 6,725,392 B1 | 4/2004 | Frey et al. ................. 714/6 |
| 6,996,501 B1 | 2/2006 | Rothberg ................ 702/186 |
| 7,024,582 B2 | 4/2006 | Loy et al. ................. 714/4 |
| 7,117,201 B2 | 10/2006 | Kuno et al. ................ 707/3 |
| 2003/0009563 A1 | 1/2003 | Douglis et al. .......... 709/227 |
| 2003/0188097 A1 | 10/2003 | Holland et al. .......... 711/114 |
| 2004/0003055 A1 | 1/2004 | Holland et al. .......... 709/219 |
| 2004/0073582 A1 | 4/2004 | Spiegel .................. 707/204 |
| 2004/0205110 A1 | 10/2004 | Hinshaw ................ 709/201 |
| 2005/0165662 A1 | 7/2005 | Shigetomi et al. .......... 705/27 |
| 2005/0273686 A1 | 12/2005 | Turner et al. ............. 714/752 |
| 2005/0283645 A1 | 12/2005 | Turner et al. ............. 714/4 |

* cited by examiner

*Primary Examiner*—Stephen C. Elmore
(74) *Attorney, Agent, or Firm*—Gunnison, McKay & Hodgson, L.L.P.; Lisa A. Norris

(57) ABSTRACT

A method includes determining a garbage collection list for a data storage structure of a node in a data storage system, the garbage collection list including one or more layout map identifiers (IDs) for garbage collection. A data fragment stored on the data storage structure is located at a first location and a layout map ID associated with the data fragment is determined. A determination is made whether the layout map ID associated with the data fragment matches a layout map ID for garbage collection in the garbage collection list. If the layout map ID associated with the data fragment matches a layout map ID for garbage collection in the garbage collection list, a determination is made whether the data fragment is present at a second location on the data storage system. If the data fragment is present at a second location on the data storage system, the data fragment at the first location is determined to be a garbage fragment and deleted from the data storage system.

17 Claims, 14 Drawing Sheets

METHOD OF GARBAGE COLLECTION ON A DATA STORAGE SYSTEM

This application is a continuation-in-part of U.S. patent application Ser. No. 10/883,299, filed Jun. 30, 2004, and entitled "Method For Recovery of Data", which is incorporated herein by reference in its entirety.

BACKGROUND OF THE INVENTION

1. Field of the Invention

The present invention is directed to the field of data storage. In particular, the present invention is directed to collection of garbage data on a data storage system.

2. Description of Related Art

The quantity of fixed data content, such as text files and image files, is rising rapidly. For example, the Internet Archive WayBack Machine (www.archive.org) currently archives 30 billion web pages.

Further, compliance with stricter government regulations is requiring the storage of large amounts of selected data, such as securities and medical data, together with procedures for timely and verifiable retrieval of this data from the data storage system.

Due to rapidly increasing processor performance and disk storage size, data is increasingly stored on computer-based data storage systems, and, particularly, disk drives. However, while the storage capacity on disk drives has progressed rapidly, the ability to locate, access, and retrieve selected data has not progressed at the same rate. In particular, once selected data is located in a data storage system, the retrieval of the data is still limited by the performance of the disk head to write or read the data to or from the disk, as well as the bandwidth of the communication channels used to transfer the data into or out of the data storage system.

Prior art data storage systems primarily based the reliability of the data storage system on the hardware utilized by the system. Thus, many prior art storage systems often used highly configured data storage systems with costly hardware and inflexible architectures to attempt to manage the storage and retrieval of data in large data storage systems. If a component failed, a system administrator was often immediately notified to repair or replace the component to prevent failure of the system. Consequently, one or more system administrators were sometimes needed to maintain the hardware, and thus the reliability of the data storage system.

Additionally, most prior art data storage systems permitted modification of data stored on the data storage system. Thus, to maintain coherent data, these prior art data storage systems often utilized lock managers that prevented concurrent modification of stored data. Disadvantageously, the lock managers often became a bottleneck in the data storage system.

Further, if a user desired to execute an application using data stored on a prior art data storage system, the data had to be located on the data storage system, transferred from the data storage system to the user's system, and then the application could be executed using the transferred data on the user's system. When large amounts of data were requested, data transfer was often a lengthy process due to bandwidth limitations of the communications channels used to transfer the data. Additionally, once the user received the data, the user was limited to the processing capabilities of their computer system.

SUMMARY OF THE INVENTION

In accordance with one embodiment of the invention, a method includes determining a garbage collection list for a data storage structure of a node in a data storage system, the garbage collection list including one or more layout map identifiers (IDs) for garbage collection. A data fragment stored on the data storage structure is located at a first location and a layout map ID associated with the data fragment is determined. A determination is made whether the layout map ID associated with the data fragment matches a layout map ID for garbage collection in the garbage collection list. If the layout map ID associated with the data fragment matches a layout map ID for garbage collection in the garbage collection list, a determination is made whether the data fragment is present at a second location on the data storage system. In one embodiment, the second location is a disk mask location. If the data fragment is present at a second location on the data storage system, the data fragment at the first location is determined to be a garbage fragment and deleted from the data storage system.

BRIEF DESCRIPTION OF THE DRAWINGS

The accompanying drawings, which are incorporated in, and constitute a part of this specification, illustrate embodiments of the invention, and together with the description, serve to explain the invention. In the drawings, the same reference numbers are used to denote similar components in the various embodiments.

In the drawings.

DETAILED DESCRIPTION

The invention will now be described in reference to the accompanying drawings. The same reference numbers may be used throughout the drawings and the following description to refer to the same or like parts.

Figure 14:
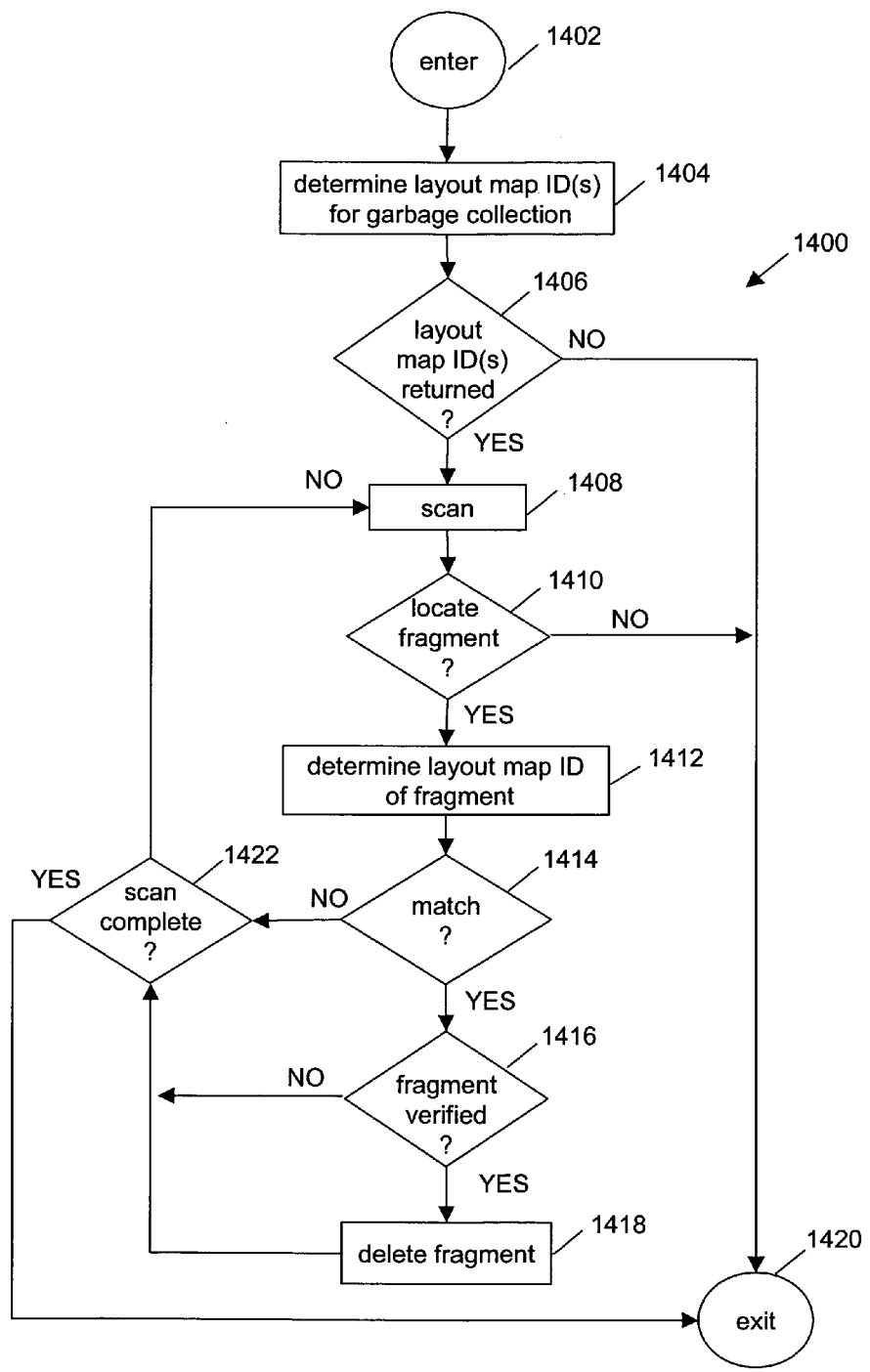
FIG. 14 illustrates a process flow diagram of a method for garbage collection of garbage fragments on a data storage system in accordance with one embodiment of the invention.

In accordance with one embodiment, referring to FIG. 14, a method 1400 includes determining a garbage collection list for a data storage structure of a node in a data storage system, the garbage collection list including one or more layout map identifiers (IDs) for garbage collection (operation 1404). The data storage structure is scanned (operation 1408), and a data fragment stored on the data storage structure is located at a first location (operation 1410. A layout map ID associated with the data fragment is determined (operation 1412), and a determination is made whether the layout map ID associated with the data fragment matches a layout map ID for garbage collection in the garbage collection list (operation 1414).

If the layout map ID associated with the data fragment matches a layout map ID for garbage collection in the garbage collection list ("YES"), a determination is made whether the data fragment is present at a second location on the data storage system (operation 1416). In one embodiment, the second location is a disk mask location. If the data fragment is present at a second location on the data storage system ("YES"), the data fragment at the first location is determined to be a garbage fragment and deleted from the data storage system (operation 1418).

Alternatively, if the data fragment does not match one of the layout map IDs in the garbage collection list, or is not present at the second location, the data fragment is not deleted. A determination is made whether the scan of the data storage structure is complete (operation 1422). If the scan is not complete, the method returns to operation 1408, otherwise the method is exited (operation 1420).

Figure 2:
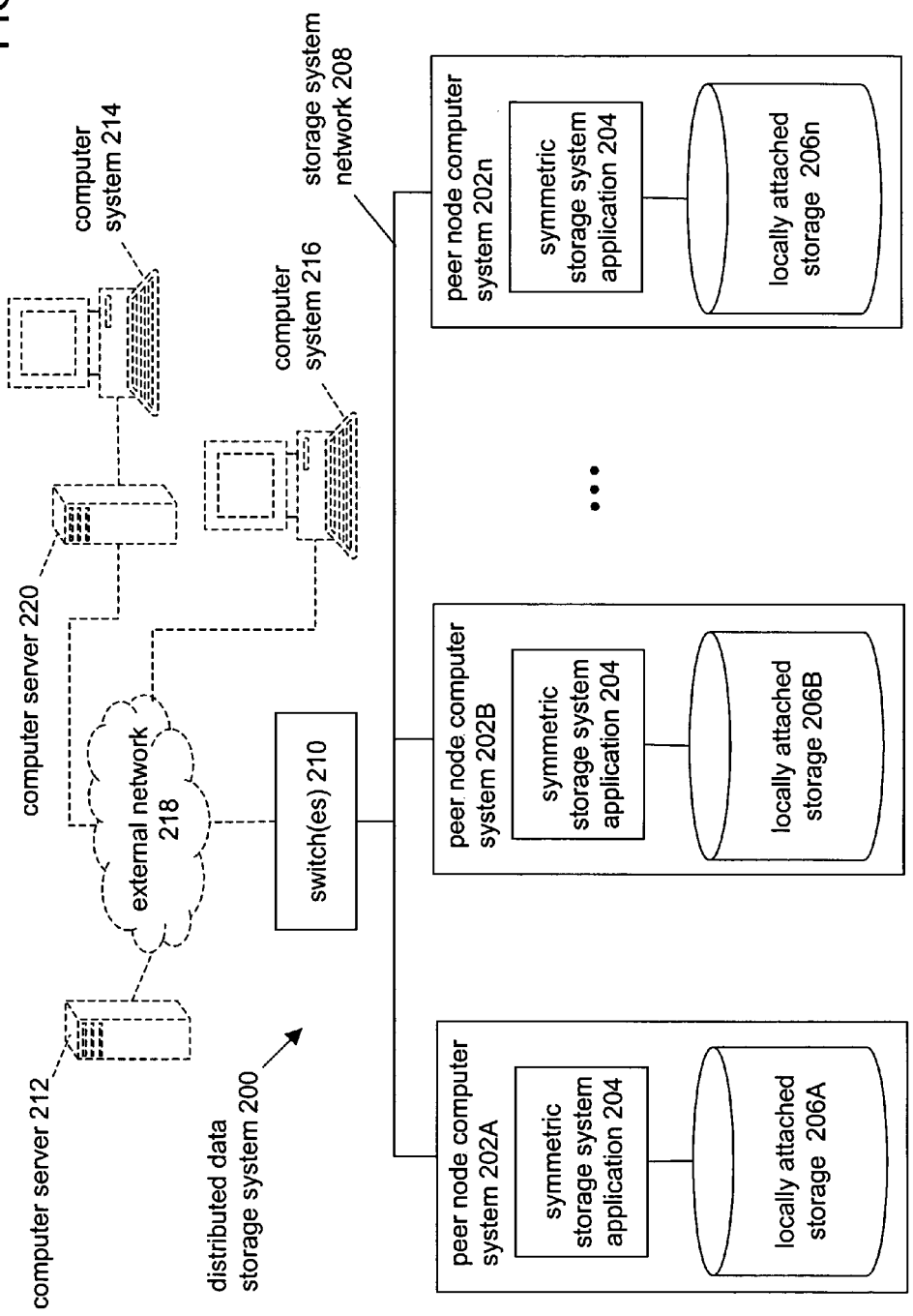
FIG. 2 illustrates a diagram of a distributed data storage system on which the method of FIG. 1 is implemented for distributively storing data in accordance with one embodiment of the invention.

Method 1400 is further described herein as implemented on a distributed data storage system 200 with reference to FIG. 2. Those of skill in the art can recognize that method 1400 can be implemented on other distributed data storage systems that can support the operations of method 1400 as further described herein.

FIG. 2 illustrates a diagram of a distributed data storage system 200 on which method 1400 is utilized for removing garbage data object fragments in accordance with one embodiment of the invention. As illustrated, in one embodiment, intelligent data storage system 200, hereinafter referred to as storage system 200, includes a plurality of peer node computer systems 202A-202n, hereinafter referred to as nodes 202A-202n, interconnected by a storage system network 208. In one embodiment, each node 202A-202n includes a network protocol interface that allows data to be stored, retrieved, and operated on in storage system 200 through any of nodes 202A-202n. Further, in one embodiment, each node 202A-202n is assigned a different IP address.

In the present embodiment, each node 202A-202n includes a symmetric storage system application 204 including method 1400 connected to locally attached storage 206A-206n, respectively. For example, symmetric storage system application 204 is connected to locally attached storage 206A in node 202A. In storage system 200, symmetric storage system application 204 is symmetric, i.e., the same, across all of nodes 202A-202n, however, the hardware components that make up each node 202A-202n, for example, locally attached storage 206A, need not be symmetric.

Each node 202A-202n is a complete compute and storage unit and includes all the software required to run storage system 200. In one embodiment, the group of one or more nodes 202A-202n, for example, sixteen nodes, are termed a cell, and management of the cell is by any of nodes 202A-202n (at any one time), herein termed a master node. In one embodiment, selection of a master node is determined using an election process. Election processes are well known to those of skill in the art and are not further described herein for clarity of description of the present invention.

In one embodiment, each node 202A-202n provides status information over storage system network 208 that is received by the other nodes and used to build and maintain individual views of the cell, herein termed a cell view. In one embodiment, a cell view includes information about whether a node 202A-202n is active and available for storage of data and about which node 202A-202n is the master node. In other embodiments, the status information provided by each node 202A-202n and the cell view includes additional information, such as the availability of individual storage structures in each locally attached storage 206A-206n, and data storage levels of each locally attached storage 206A-206n.

When a node failure is detected in the cell view, each affected node 202A-202n in storage system 200 independently starts a recovery process to reconstruct data stored on the failed node or on a locally attached storage allowing distributed and balanced recovery of data in which the storage reliability of a data object is maintained.

In FIG. 2, some of nodes 202A-202n can be active and available, herein termed on-line, while some others of nodes 202A-202n may not be actively available, herein termed off-line. Any of nodes 202A-202n can be selectively brought on-line or taken off-line in storage system 200 as needed. In the present description, a node 202A-202n is assumed to be on-line and available unless otherwise specified. Those of skill in the art can recognize that in other embodiments the status of nodes 202A-202n can be differently defined, for example as available, unavailable, on, off, waiting, updating, or error.

In one embodiment, each of nodes 202A-202n is a field replaceable unit (FRU). In one embodiment, when a new node is added to storage system 200, the new node is automatically recognized by storage system 200 and any needed applications, such as symmetric storage system application 204, is automatically loaded on to the new node from one of nodes 202A-202n. The new node is then registered with storage system 200, any needed formatting is performed, and any data transfer to the new node occurs.

Data is stored on storage system 200 as data objects. Herein a data object is data of a finite length that is separately identifiable from other data objects and is transferable to storage system 200, for example, a text file, an image file, or a program file, among others.

In one embodiment, a layout map ID is generated and associated with a data object. The layout map ID is used to determine a layout map for distributed placement of the data object on storage system 200.

In one embodiment, an object identifier (ID) is generated and assigned to each data object. In one embodiment, the object ID is a unique identifier based on an intrinsic property of the data object, such as the content of the data object, which identifies the data object and provides content addressability for the data object. In another embodiment, the object ID is randomly generated and not based on content. In a further embodiment, the object ID is based on a randomly generated value and includes the layout map ID used in placement of the data object on storage system 200. In one embodiment, the data object is divided into data fragments to permit distributed placement of the data object on storage system 200.

During fragmentation of a data object, parity fragments are also generated in accordance with external criteria, such as a desired reliability of storage. The data fragments and the parity fragments are distributively stored on storage system 200 in accordance with the layout map and associated with the object ID.

System metadata is also generated during fragmentation of a data object, and at least a portion of the system metadata is stored with each data fragment and parity fragment and is used to reconstruct the data object. Metadata generated from other sources, termed extended metadata, can also be associated with a data object. Thus, although a data object has a single object ID, several metadata can be associated with the object ID.

In one embodiment, a unique metadata object identifier (ID) is generated for each metadata associated with a data object. In one embodiment, selected metadata are indexed and stored in one or more metadata caches to provide enhanced searching and retrieval of data objects on storage system 200.

In one embodiment, storage system 200 includes mechanisms for uploading an application, herein termed a disklet, onto storage system 200 and executing the disklet on storage system 200 using data objects that are being written to, being read from, or are stored on storage system 200.

In the present embodiment, access to storage system 200, and, in particular, to nodes 202A-202n, is via a switch 210. In some embodiments, one or more switches 210 are utilized, for example, to provide redundancy or back-up in the event of failure of a switch 210.

In one embodiment, switch 210 is configured to support communications on two networks: an external network for external traffic between storage system 200 and external clients, such as computer servers 212 and 220, and computer system 216 on external network 218; and an internal network, i.e., storage system network 208, for internal traffic between nodes 202A-202n.

In one embodiment, switch 210 is configured to present two IP addresses to the external network: a virtual IP address for client access to storage system 200; and, an administrative IP address used to access both switch 210 and a node 202A-202n designated as the master node. The administrative IP address is further used to permit administration of storage system 200, such as by a system administrator, for example on computer system 214. In this embodiment, although each of nodes 202A-202n has an associated IP address, nodes 202A-202n are abstracted from clients on the external network, allowing nodes 202A-202n, to be viewed as a single entity.

Requests, such as store and retrieve requests, received by switch 210 are sent to a node 202A-202n in storage system 200 using a specified schema, such as according to a switching table utilized by switch 210. In one embodiment, the switching table is periodically updated, e.g., reconfigured, by one or more of nodes 202A-202n to dynamically effect a desired load spreading on storage system 200.

In an alternative embodiment, rather than switch 210 presenting a single IP address to external clients, each node 202A-202n presents its assigned IP address to the external network via switch 210, and, rather than load spreading occurring at switch 210, a basic load spreading mechanism is included with a client API (resident at the client) in order to spread the load among nodes 202A-202n. In one embodiment, a listing of nodes 202A-202n is passed to the client API in order to effect the load spreading.

Figure 3:
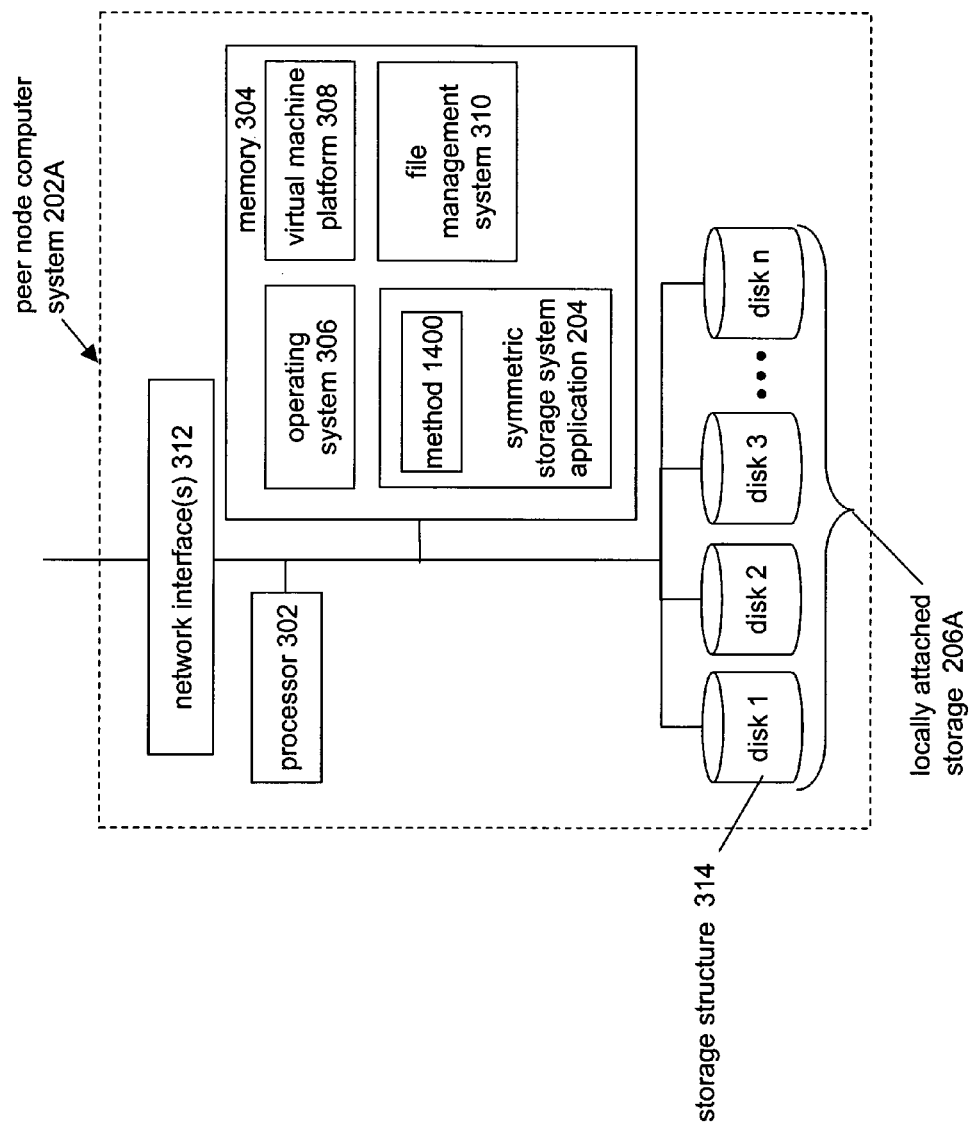
FIG. 3 illustrates one example of a peer node computer system in accordance with one embodiment of the invention.

FIG. 3 illustrates one example of peer node computer system 202A in accordance with one embodiment of the invention. Although the present embodiment is described with reference to peer node computer system 202A, herein node 202A, the description is applicable to any of nodes 202A-202n. It is to be understood that the present example is chosen for illustrative purposes only, and that other configurations and hardware are possible, in particular, locally attached storage 106A can be formed of fewer or greater numbers of storage structures, e.g., disk 1-disk n, and with individually different storage capacities.

In FIG. 3, in one embodiment, node 202A includes one or more network interface(s) 312 which provide connectivity to network 208 (including switch(es) 210). In embodiments in which one or more switch(es) 210 are present in storage system 200, one or more corresponding network interface(s) 312 can be utilized on node 202A.

In the present embodiment, node 202A further includes: a processor 302; a memory 304; an operating system 306; a virtual machine platform 308; a file management system 310; symmetric storage system application 204; and locally attached storage 206A. In one embodiment, locally attached storage 206A includes one or more storage structures 314, such as a finite number of disks 1-*n*, for example, four disks.

In the present embodiment, node 202A is organized to be an ergonomically acceptable field replaceable unit (FRU), for example, in one embodiment, a 1U form factor FRU.

Figure 4:
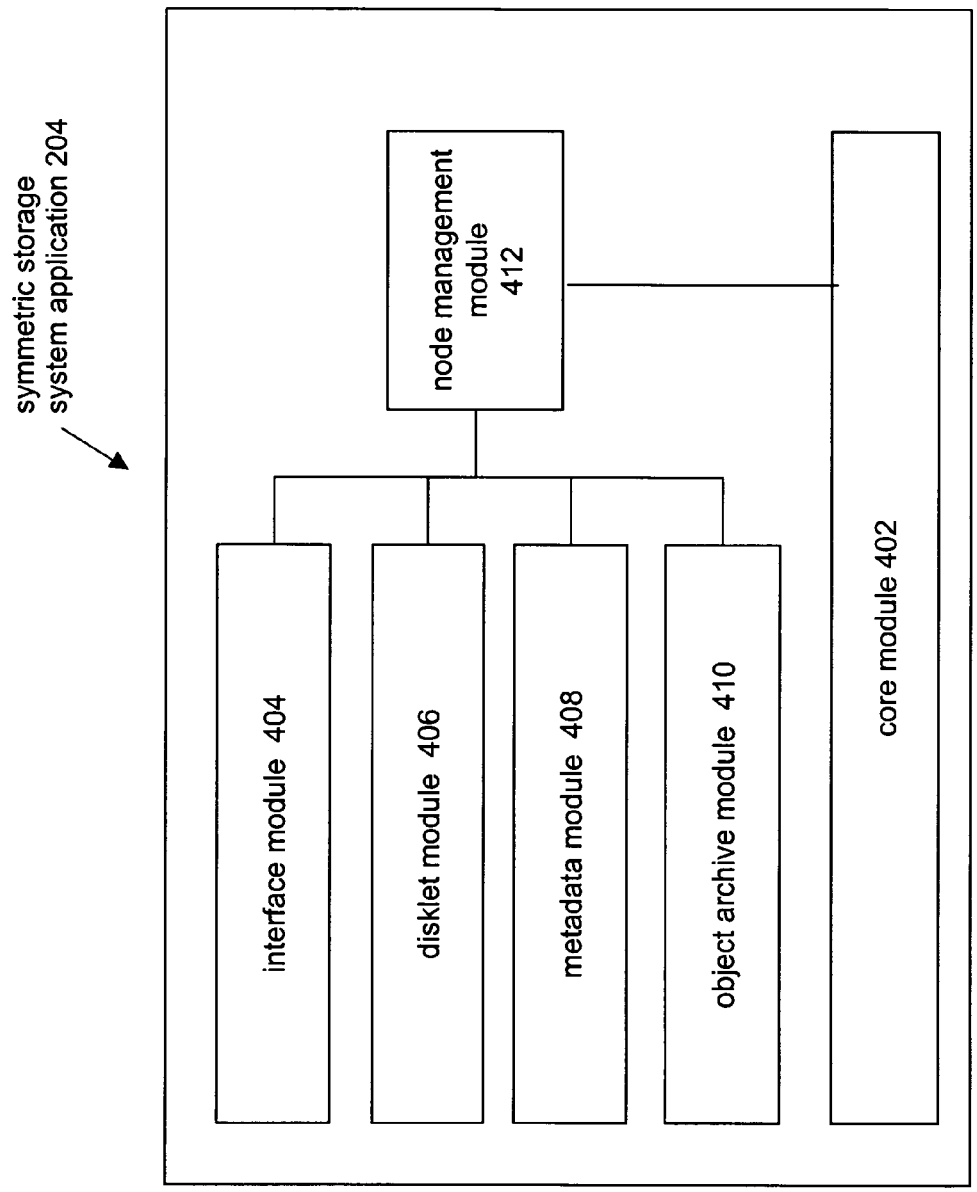
FIG. 4 illustrates a functional block diagram of a symmetric storage system application of a peer node computer system in accordance with one embodiment of the invention.

FIG. 4 illustrates a functional block diagram of symmetric storage system application 204 of node 202A in accordance with one embodiment of the invention. As illustrated in FIG. 4, in one embodiment, symmetric storage system application 204 includes: a core module 402; an interface module 404; a disklet module 406; a metadata module 408; an object archive module 410; and, a node management module 412.

In one embodiment, node management module 412 controls modules 402, 404, 406, 408, and 410 of symmetric storage system application 204, and controls storage system 200 in instances when node 202A is designated, e.g., elected, as the master node. In one embodiment, functions utilized in controlling storage system 200 can be embodied as a separate cell management module (not shown) in symmetric storage application 204, and the cell management module is inactive until activated by the designation, e.g., election of the node as the master node.

Node management module 412 generates and maintains an overall view of storage system 200, herein termed a cell view, that includes information about nodes 202A-202n present in the cell and about which node is the currently acting master node. Based on changes to the cell view, node management module 412 can independently start a recovery process to reconstruct data stored on a failed node 202B-202n or stored on a failed storage structure of locally attached storage device 206A. Node management module 412 can further independently start a garbage collection process to remove data from the node (node 202A), such as duplicate data fragments.

In the present embodiment, node management module 412 includes a monitoring function and a management function. Node management module 412 monitors modules 402, 404, 406, 408, and 410 to gather information about the operational status of node 202A and storage system 200.

Node management module 412 has hooks, i.e., communication links, into interface module 404, disklet module 406, metadata module 408, and object archive module 410 to monitor each module in node 202A. Node management module 412 also communicates with core module 402 and monitors core module 402 for any events, such as error codes generated during the monitoring of the hardware. In the event core module 402 does not have the capability to perform hardware monitoring and event generation, node management module 412 includes mechanisms that permit it to assume these functions.

The monitoring function of node management module 412 generates events, as needed, that the management function acts on. The management function of node management module 412 includes response strategies for responding to different events, such as error codes, and executes the response strategies based on the event, for example, harvesting data, and rebooting a node, among others.

In one embodiment, the monitoring of modules 402, 404, 406, 408 and 410 is implemented using a near stateless communication process termed a shared mailbox, also conventionally termed a distributed mailbox, hints, or heartbeats. In shared mailbox communications each module 402, 404, 406, 408, 410, and 412 sends a "heartbeat" that indicates its status at a designated interval or time. Each module 402, 404, 406, 408, 410, and 412 does not have to be individually queried as to its status, but rather the "heartbeats" are monitored for any changes that require a response to be generated. Thus, each module 402, 404, 406, 408, and 410 is generally able to maintain its status without having to lock on to any particular process to provide its status. In one embodiment, the "heartbeat" of node management module 412 is monitored by a node management module of another node. For example, the "heartbeat" of node management module 412 in node 202A is monitored by a node management module in node 202B.

As earlier described, node management module 412 communicates with core module 402 and monitors core module 402 for any events, such as error codes generated during the monitoring of the hardware. In one embodiment, core module 402 includes information about the hardware of node 202A, such as the number, types, and layout of disks, the number and types of communication channels, processor 302, and network interface(s) 312.

Core module 402 also includes information about the operating system and other applications utilized on storage system 200 on node 202A. For example, referring to node 202A (FIG. 2), core module 402 includes information about operating system 306, virtual machine platform 308, and file management system 310. In some embodiments, core module 402 monitors operating system 306, virtual machine platform 308, and file management system 310.

Additionally, core module 402 includes a series of drivers that allow instructions to be passed between symmetric storage system application 204 and the hardware of node 202A.

In one embodiment, interface module 404 provides a transfer protocol and overarching application program interface (API) to access storage system 200. In one embodiment, the transfer protocol is Hypertext Transfer Protocol (HTTP), however in other embodiments, other protocols can be used, such as the Network File System (NFS) protocol and the Web-based Distributed Authoring and Versioning (WebDAV) protocol. In one embodiment, the language binding for the API is Java@, however in other embodiments, other language bindings can be used, for example, a C language binding. Transfer protocol, application program interface, and language binding are terms well known to those of skill in the art and are not further described herein to avoid detracting from the description of the present invention.

Interface module 404 receives requests to store, e.g., write, read, and operate on data on storage system 200. Interface module 404 receives any metadata provided with data to be stored on storage system 200. Interface module 404 also receives disklets for storage and execution on storage system 200.

In one embodiment, disklet module 406 manages disklets stored and executing on storage system 200. A disklet is code, e.g., an application, written by a user against a disklet API, such as a Java® API, for storage and execution on storage system 200. In one embodiment, the disklet is precompiled code, such as Java® byte code. In one embodiment, a disklet is developed on a user's system, such as computer systems 214 or 216, and uploaded to storage system 200.

The disklet is stored on storage system 200 and a handle to the disklet is generated by disklet module 406 and returned to the user. The user uses the handle in a request to execute the disklet using data that is stored on, being read from, or being written to storage system 200. Thus, a disklet is executed on storage system 200 and the results returned to the user (if so desired). Thus, data does not have to first be retrieved and transferred to the user in order to execute the application.

In one embodiment, disklet module 406 also implements disklet security to prevent disklets from inadvertently or maliciously damaging storage system 200. In one embodiment, Java® sandboxing is used to set limits on what operations a disklet can perform and to externally limit the amount of processing and memory a disklet can consume.

In one embodiment, a disklet is first read by a security application of disklet module 406 that determines whether the disklet is approved for use on storage system 200. In one embodiment, an approved disklet is identified as approved, e.g., signed, and allowed to be used on storage system 200. A non-approved disklet is not identified as approved, e.g., not signed, and can be deleted, quarantined, or processed for further security evaluation. In some embodiments, a notification is generated advising a user that a disklet is not approved.

In one embodiment, object archive module 410 distributively stores, retrieves, and reconstructs data objects in storage system 200. Retrieval and reconstruction of data objects in storage system 200 is based upon the mechanism of storage implemented by object archive module 410.

In storing a data object, object archive module 410 determines placement, fragmentation, and storage of a data object. During placement, object archive module 410 receives a data object and determines a set of storage structures, such as hard disk drives, to be used in distributively storing fragments of the data object, including data fragments and parity fragments.

In one embodiment, object archive module 410 generates a random, and reproducible layout map identifier (ID) that is assigned to the data object. While non-random layout map IDs may be used, assignment of randomized layout map IDs allows data objects to be evenly distributed among storage structures of locally attached storage 206A-206n in storage system 200, even if some of nodes 202A-202n are removed or added.

The layout map ID is used to generate a layout map which represents possible distributed layouts for that data object in storage system 200 based on the current availability of storage structures, for example storage disks, in locally attached storage 206A-206n. In one embodiment, object archive 410 maintains a current view of the available storage structures in storage system 200, herein termed a disk mask, for use in generating layout maps.

In one embodiment, a layout map indicates an initial distribution, or initial layout, of fragments for a data object in selected storage structures of one or more of locally attached storage 206A-206n, as well as alternative locations for fragments, such as when a storage structure in the initial layout fails or otherwise becomes unavailable or when a previously unavailable storage structure becomes available.

Figure 5:
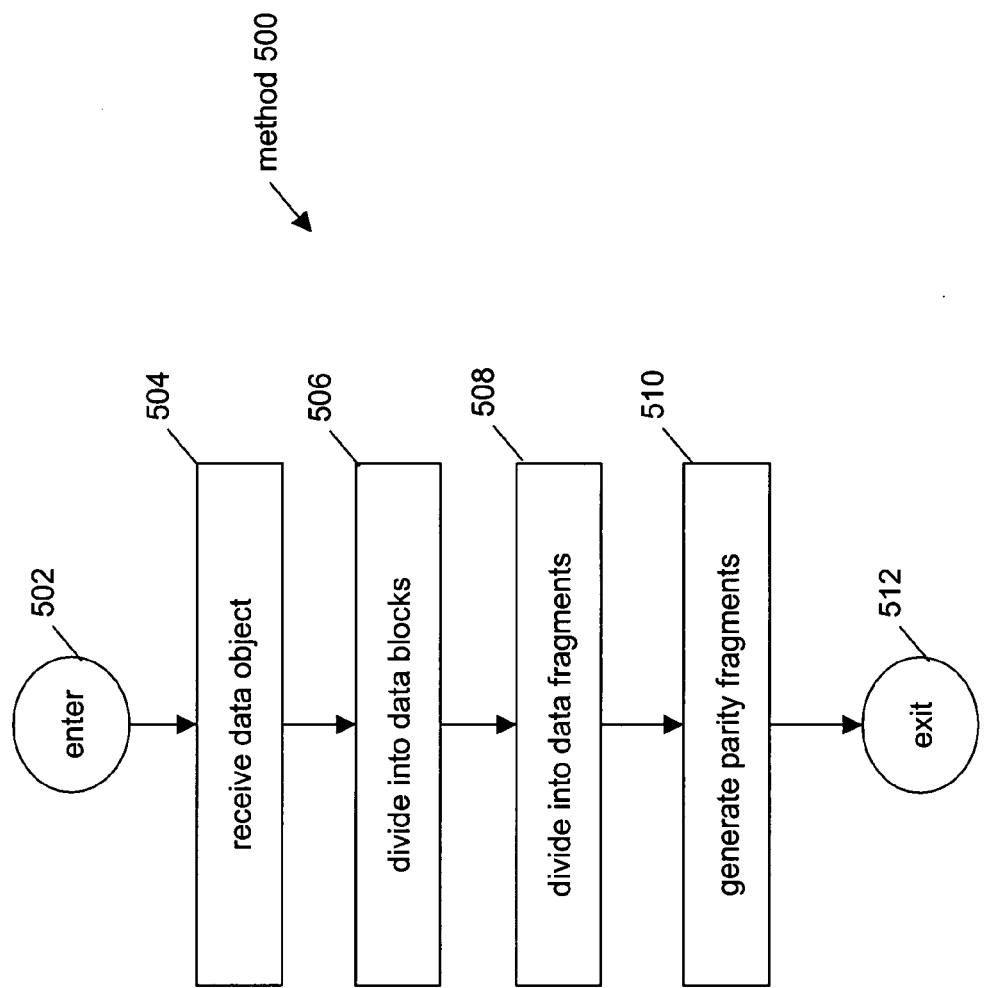
FIG. 5 illustrates a process flow diagram of a method for dividing a data object into data fragments with the generation of parity fragments in accordance with one embodiment of the invention.
Figure 6:
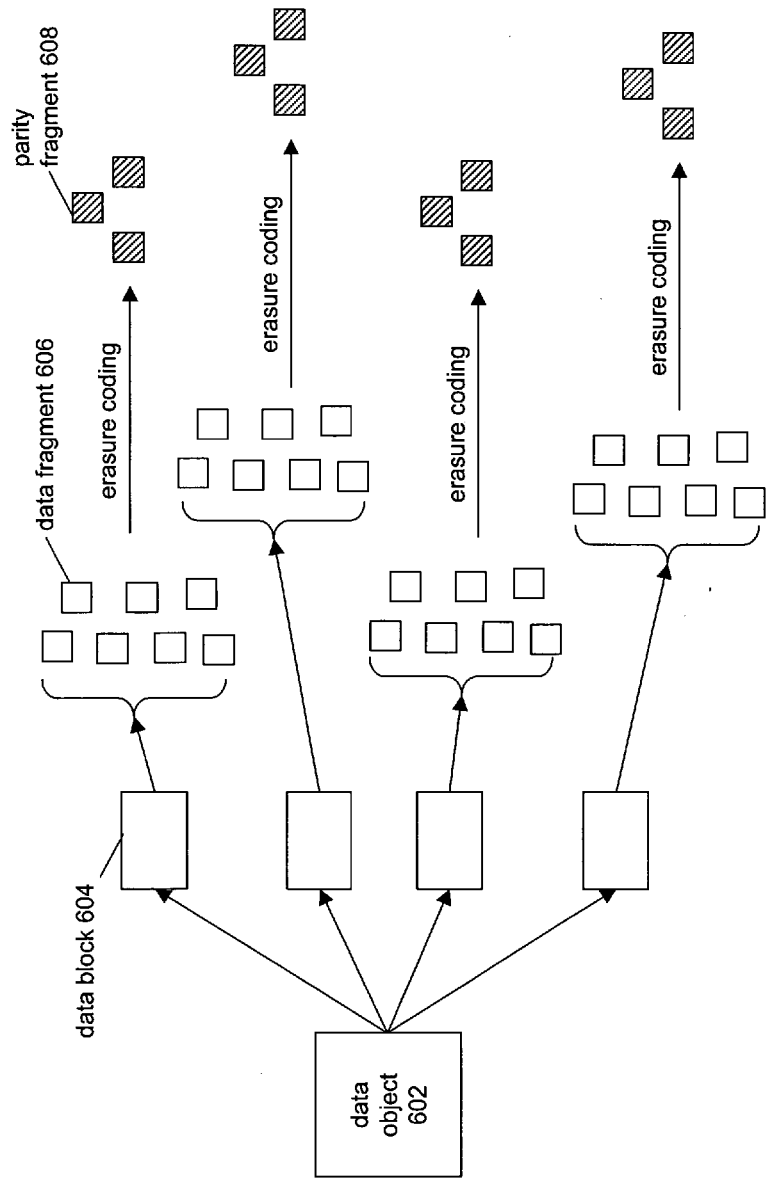
FIG. 6 illustrates the method of FIG. 5 in accordance with one embodiment of the invention.

In fragmentation of a data object, in one embodiment, object archive module 410 divides the data object into data fragments and further generates parity fragments as further described herein with reference to FIGS. 5 and 6.

FIG. 5 illustrates a process diagram of a method 500 for dividing a data object into data fragments with the generation of parity fragments in accordance with to one embodiment of the invention. FIG. 6 illustrates method 500 in accordance with one embodiment of the invention. In one embodiment, method 500 (FIG. 5) is implemented by object archive module 410 (FIG. 4) of symmetric storage system application 204 (FIG. 3). Referring initially to FIG. 5, in one embodiment, from an ENTER operation 502, processing transitions to a RECEIVE DATA OBJECT operation 504.

In RECEIVE DATA OBJECT operation 504, referring additionally to FIGS. 4, 5, and 6, object archive module 410 receives a data object 602 for storage in storage system 200 (FIG. 2). In one embodiment, object archive module 410 generates a unique object identifier (ID) for the data object. In one embodiment, the object ID is generated based upon an intrinsic property of the data object. In one embodiment, the object ID is generated based upon the content of the data object.

In one embodiment, object archive module 410 generates the object ID for data object 602 using an SHA-1 hash of the data object contents. In other embodiments, the object ID can be generated based upon other intrinsic properties of the data object that result in a unique object ID. Uniquely identifying a data object based on its content or other intrinsic property of the data object enables the unique identifier, i.e., the object ID, to be used as an identifier of the data object in storage system 200 and provides content addressability. Upon receipt of data object 602 and generation of the object ID, processing transitions from RECEIVE DATA OBJECT operation 504 to a DIVIDE INTO DATA BLOCKS operation 506.

In DIVIDE INTO DATA BLOCKS operation 506, object archive module 410 divides data object 602 into one or more data blocks 604. Herein a data block is a portion of a data object, such as a logical data size that operating system 306 uses to read or write files, for example, 384 KB. In one embodiment, based on the object ID, any of data blocks 604 can be distributed to any of the other nodes 202B-202n in storage system 200 and the remainder of method 500 performed at those other nodes 202B-202n. Upon division of data object 602 into data blocks 604, processing transitions from DIVIDE INTO DATA BLOCKS operation 506 to a DIVIDE INTO DATA FRAGMENTS operation 508.

In DIVIDE INTO DATA FRAGMENTS operation 508, object archive module 410 divides each of data blocks 604 into one or more data fragments 606. Herein a data fragment is a portion of a data block, such as 64 KB on disk. Upon division of each of data blocks 604 into data fragments 606, processing transitions from DIVIDE INTO DATA FRAGMENTS operation 508 to a GENERATE PARITY FRAGMENTS operation 510.

In GENERATE PARITY FRAGMENTS operation 510, object archive module 410 applies an erasure coding algorithm, such as a Reed-Solomon erasure coding algorithm, to data fragments 606 from each of data blocks 604 to generate one or more parity fragments 608. In one embodiment, any parity fragment 608 can be used to generate any data fragment 606 of data block 604 of data object 602. In one embodiment, the erasure coding algorithm utilizes an external criterion, such as a desired reliability of storage, in generating parity fragments 608. Upon generation of parity fragments 608, processing transitions from GENERATE PARITY FRAGMENTS operation 510 to an EXIT operation 512 with processing exiting method 500.

In an alternative embodiment, object archive module 410 divides data object 602 directly into data fragments 606 and the erasure coding algorithm is applied to data fragments 606 to generate parity fragments 608, e.g., operation 506 is not performed. Although division of data object 602 into data blocks 604 is not a required intermediate operation to division of data object 602 into data fragments 606, it enables parallelization of operations 508 and 510 by enabling data blocks 604 to be distributed to other nodes 202B-202n in which the generation of data fragments 606 and parity fragments 608 can occur.

Following generation of the data fragments and parity fragments (method 500), object archive module 410 stores the data fragments of the data object and the parity fragments associated with the data object to one or more storage structures, e.g., storage disks, in storage system 200, in accordance with the layout map associated with the data object. In one embodiment, object archive 410 periodically evaluates storage structures in locally attached storage 206A, for example by checking disk segments of disks, and reporting problems to node management module 412 (FIG. 4).

During placement, fragmentation, and storage of a data object, object archive module 410 also generates metadata associated with the data object. Metadata is data that provides a description of a data object stored in storage system 200, and is used to perform searches and retrieve data in storage system 200. In particular, object archive module 410 generates system metadata which is metadata that is stored, e.g., encapsulated, as part of each of the data fragments and parity fragments of that data object.

In one embodiment, system metadata includes information that is utilized by object archive module 410 to retrieve and reconstruct a data object once a data object fragment of that data object is located. Examples of system metadata include number of data fragments, number of parity fragments, the layout for a data object, the data fragment length, the size of a data object, and the create time for a data object. System metadata generated by object archive module 410 are also provided to metadata module 408.

In one embodiment, metadata module 408 receives metadata from metadata generators, such as an object archive, e.g., object archive module 410, a client, e.g., a client application program interface (API), or a disklet, e.g., an executing disklet. In one embodiment, as earlier described with reference to object archive module 410, metadata received from object archive module 410 is termed system metadata. Other metadata, such as metadata received from a client or generated in accordance with a disklet, is termed extended metadata.

Extended metadata received by metadata module 408 is passed to object archive 410 for distributed storage on storage system 200. In one embodiment, metadata module 408 locates the layout map ID and provides the layout map ID to object archive module 410.

Object archive module 410 determines the placement of the metadata based on the layout map ID. In one embodiment, object archive module 410 fragments the metadata similar to a data object as earlier described with reference to FIGS. 5 and 6 with resultant metadata data fragments and metadata parity fragments. Following generation of the metadata data fragments and metadata parity fragments, object archive module 410 stores the metadata data fragments and the metadata parity fragments to one or more storage structures, e.g., disks, in storage system 200.

In one embodiment, metadata module 408 further indexes selected metadata, e.g., selected from the system metadata and/or extended metadata, into one or more metadata caches. In one embodiment, each metadata cache is an indexed data store of selected metadata. In one embodiment, each metadata cache is extensible.

The metadata caches are distributively stored on storage system 200 and used to enhance searching and retrieval of data objects on storage system 200, e.g., by searching the metadata caches rather than the object archive.

Figure 7:
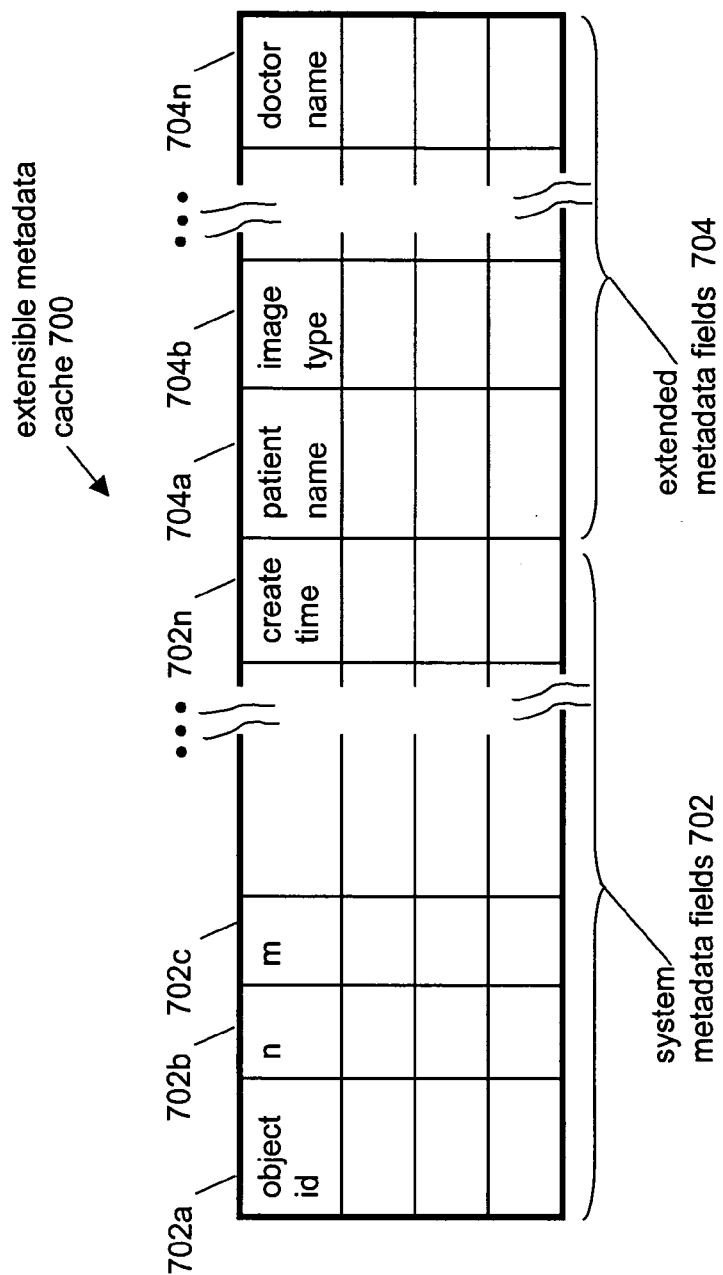
FIG. 7 illustrates a block diagram of an extensible metadata cache in accordance with one embodiment of the invention.

FIG. 7 illustrates a block diagram of an extensible metadata cache 700 in accordance with one embodiment of the invention. In FIG. 7, extensible metadata cache 700 includes system metadata fields 702, such as system metadata fields 702A-702n, and extended metadata fields 704, such as extended metadata fields 704A-704n. For example, system metadata fields 702A-702n can include: an object ID field 702A (an object ID of a data object); an "N" field 702B (number of data fragments); an "M" field 702C (number of parity fragments); and a size field 702n (size of a data object). Extended metadata fields 704A-704n, such as for those metadata generated in response to execution of a disklet on storage system 200, can include, for example: a patient name field 704A; an image type field 704B; and a doctor name field 704n. In one embodiment, the number of extended metadata fields is definable by a system administrator of storage system 200.

In one embodiment, the metadata caches generated by metadata module 408 can be replicated on any of nodes 202A-202n to provide a desired reliability. The metadata caches are scalable with the size of storage system 200 and can be distributed across nodes 202A-202n. In some embodiments, metadata module 408 can further generate metadata caches associated with selected parameters of a data object, such as a type of data object, or with a particular metadata generator.

Figure 1:
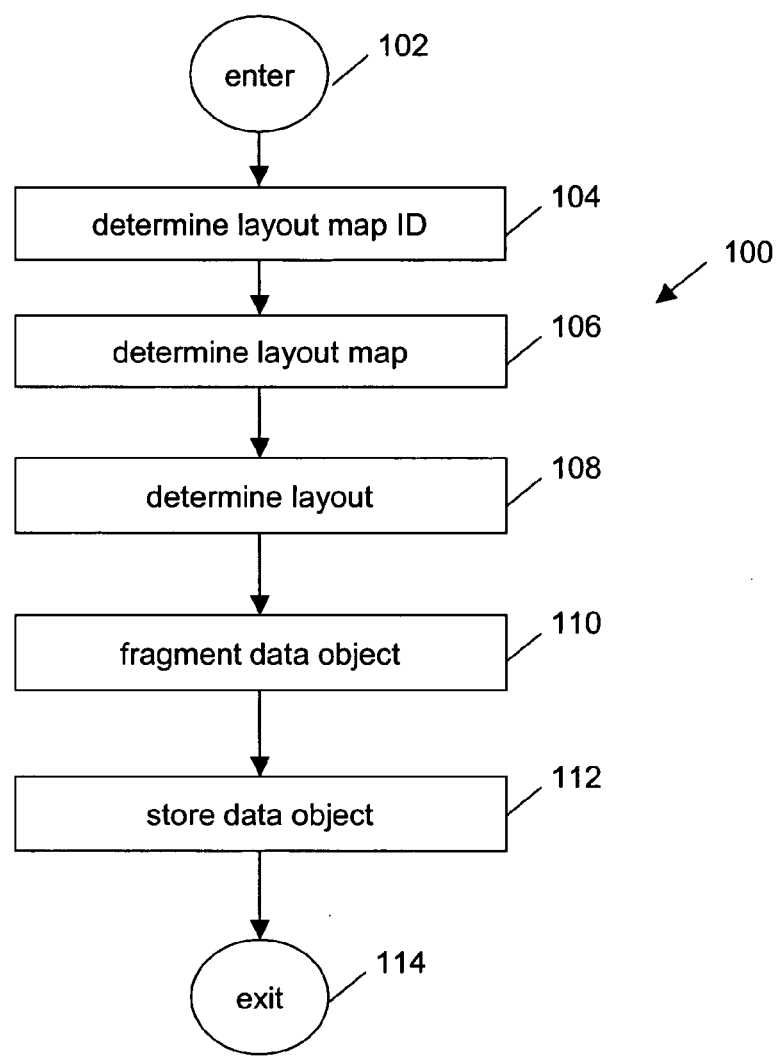
FIG. 1 illustrates one example of a method for distributively storing data objects on a data storage system in accordance with one embodiment of the invention.

FIG. 1 illustrates one example of a method 100 for distributively storing data objects on a data storage system in accordance with one embodiment of the invention. Referring now particularly to FIG. 1 together with FIG. 2, in one embodiment, method 100 is implemented on storage system 200 and used for distributively storing data objects in one or more storage structures 314 (FIG. 3) of locally attached storage 206A-206n, e.g., disks. As earlier described, each node 202A-202n maintains a cell view which includes information about whether a node 202A-202n is active and available for storage of data and about which node 202A-202n is the master node. In the present embodiment, each cell view also includes information about the availability of individual storage structures 314, e.g., individual disks. In the present embodiment, information about the availability of a node 202A-202n and the individual storage structures 314 (FIG. 3) of each locally attached storage 206A-206n in a cell view are changed when the master node approves, e.g., publishes, the changed information.

In the present embodiment, each node 202A-202n also maintains values used in determining how a data object is stored on storage system 200 including: the cell size, i.e., the number of nodes 202A-202n in the cell; the node size, i.e., the number of individual storage structures 314 (FIG. 3), such as disks, in the locally attached storage 206A-206n for each node 202A-202n, respectively; the number of data fragments per data object (N); and, the number of parity fragments generated per data object (M). In particular, the values of N and M represent a desired reliability of storage of a data object on storage system 200.

In one embodiment, the values of N and M, as well as the cell size and the node size are configured when storage system 200 is initially installed, and do not change unless storage system 200 is reconfigured for different parameters, for example, by a system administrator. Consequently, changes in the number of operational individual storage structures, e.g., disks, or available nodes 202A-202n does not affect the cell size or the node size values.

In one embodiment, method 100 is implemented on storage system 200 to distributively store data on one or more of nodes 202A-202n in accordance with a desired level of reliability. Method 100 is implemented by a node 202A-202n independent of the other nodes. Method 100 permits the reliable storage of data on storage system 200 as well as the efficient retrieval and recovery of data on storage system 200 in which reliability of data storage is maintained as further described herein.

Figure 8:
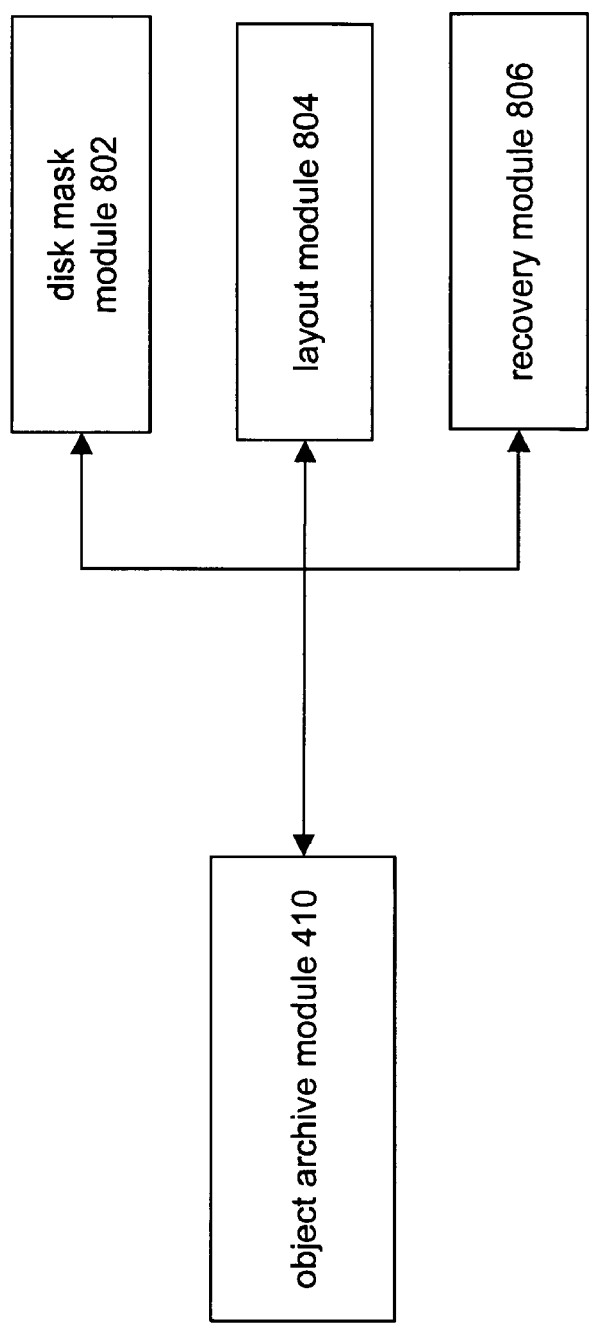
FIG. 8 illustrates a functional diagram of modules utilized by the object archive module of FIG. 4 in the storage, retrieval, and recovery of data objects in accordance with one embodiment of the invention.

In the present embodiment, method 100 is described as implemented by symmetric storage system application 204 (FIG. 2), and thus in one embodiment, is part of symmetric storage system application 204 (FIG. 2), as further described herein with reference to FIG. 8.

FIG. 8 illustrates a functional diagram of modules utilized by object archive module 410 in the storage, retrieval, and recovery of data objects in accordance with one embodiment of the invention. As illustrated in FIG. 8, in one embodiment, object archive 410 utilizes a disk mask module 802, a layout module 804, and, a recovery module 806. In one embodiment, disk mask module 802, layout module 804, and recovery module 806 are modules of symmetric storage system application 204 separate from object archive module 410 and accessible by object archive module 410. However, in other embodiments, some or all of disk mask module 802, layout module 804, and recovery module 806 are part of object archive module 410. The operations performed by each of these components in storage, retrieval, and recovery of data objects on storage system 200 are further described herein.

Referring now particularly to FIG. 1 and FIG. 8 together, in one embodiment, a request to store a data object is received at a node 202A-202n (FIG. 2), for example, at node 202A (FIG. 2). In the present embodiment, the request to store a data object is communicated to symmetric storage application 204 (FIG. 2), and in particular to object archive module 410, for example, from interface module 404 (FIG. 4). Object archive module 410 initiates a store and enters method 100 from an ENTER operation 102, and processing transitions to a DETERMINE LAYOUT MAP ID operation 104.

In DETERMINE LAYOUT MAP ID operation 104, a layout map identifier (ID) is determined and assigned to the data object. In one embodiment, object archive module 410 requests a layout map ID and a corresponding layout from layout module 804 for a data object that is to be stored.

A layout map ID is a randomly selected value that is assigned to the data object and is used by layout out module 804 as a seed in generating a layout map for storage of data object fragments of a data object. The layout map ID is independent of the data object content.

In one embodiment, the number of valid layout map IDs is restricted to a finite number to limit the number of layout maps that are generated while still being large enough to provide an acceptable distribution of data object fragments across individual storage structures 314 (FIG. 3), e.g., disks, in storage system 200 (FIG. 2). For example, in one embodiment, the number of layout map IDs is approximately 1,000 for a cell size of sixteen (16) nodes 202A-202n with four (4) individual storage structures 314 per locally attached storage 206A-206n.

In general, random assignment of layout map IDs permits a substantially even storage distribution of data objects among individual storage structures 314, e.g., disks, in storage system 200 even if nodes are removed or added. In one embodiment, the layout map ID assigned to a data object is stored as metadata indexed by metadata module 408 (FIG. 4) and associated with the data object. In one embodiment, the layout map ID is stored as system metadata with each data object fragment of the data object. From DETERMINE LAYOUT MAP ID operation 104, processing transitions to a DETERMINE LAYOUT MAP operation 106.

In DETERMINE LAYOUT MAP operation 106, layout module 804 utilizes the layout map ID as a seed in generating a layout map. The layout map represents defined layouts for the distributed placement of a data object across one or more storage structures 314, e.g., disks, in storage system 200.

Figure 9:
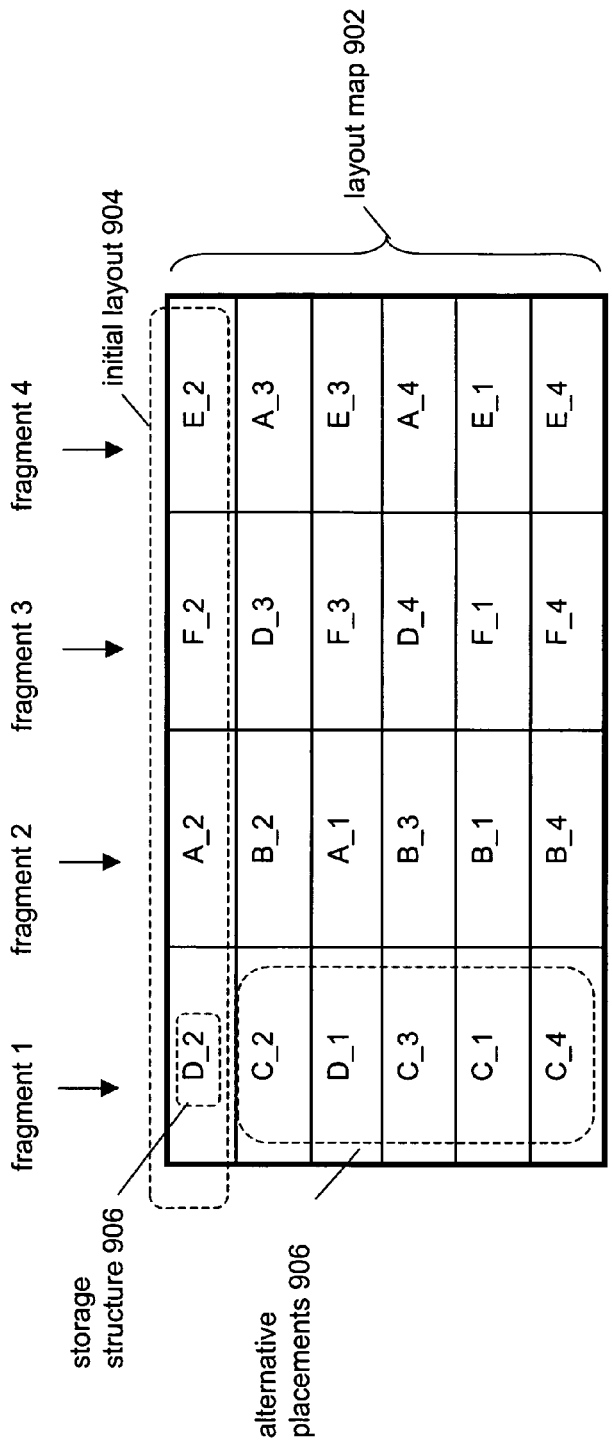
FIG. 9 illustrates an example of a layout map for a data object on a data storage system in which the number of peer node computer systems is less than the value of 2(N+M) in accordance with one embodiment of the invention.

FIG. 9 illustrates an example of a layout map 902 for a data object in accordance with one embodiment of the invention. In one embodiment, layout maps for a layout map ID in a particular cell are based upon the layout map ID, the cell size, the node size, and the maximum (N+M) data object fragments allowed in the cell (per data object).

In one embodiment, the maximum value of (N+M) for a cell is not changed once it is established. However, in other embodiments, the maximum value of (N+M) for a cell is modifiable, for example, by a system administrator. In the present embodiment, the maximum value (N+M) does not exceed the number of storage structures 314, e.g., disks, in the cell, and in some embodiments, is smaller than the number of nodes 202A-202n.

In FIG. 9, layout map 902 is represented by a matrix of columns and rows, in which the number of columns is equal to (N+M) columns, and the number of rows is equal to the total number of storage structures 314, e.g., disks, in the cell, divided by (N+M) (rounded to the closest integer). In the present example, it is assumed that the number of nodes=6, e.g., nodes 202A-202F, and (N+M)=2+2 (or 4), and each node has four storage structures 314, e.g., disks. The nodes 202A-202F are denoted using node identifiers (IDs), for example the capital letters A, B, C, D, E, and F, and storage structures 314, e.g., disks, are denoted using storage structure identifiers (IDs), for example the numbers 1, 2, 3, 4, which also denote the positions of the storage structures 314. Herein storage structure IDs are described as disk identifiers (IDs).

Each element of the matrix is an identifier of a specific storage structure 314, e.g., disk, in the cell. In the present embodiment, each storage structure 314, e.g., disk, is identified by the pair (node ID, disk ID). Thus, a letter with a numeric subscript identifies a storage structure 314, e.g., disk, on a particular node, for example A_2 identifies disk 2 on a node A, such as node 202A.

Figure 10:
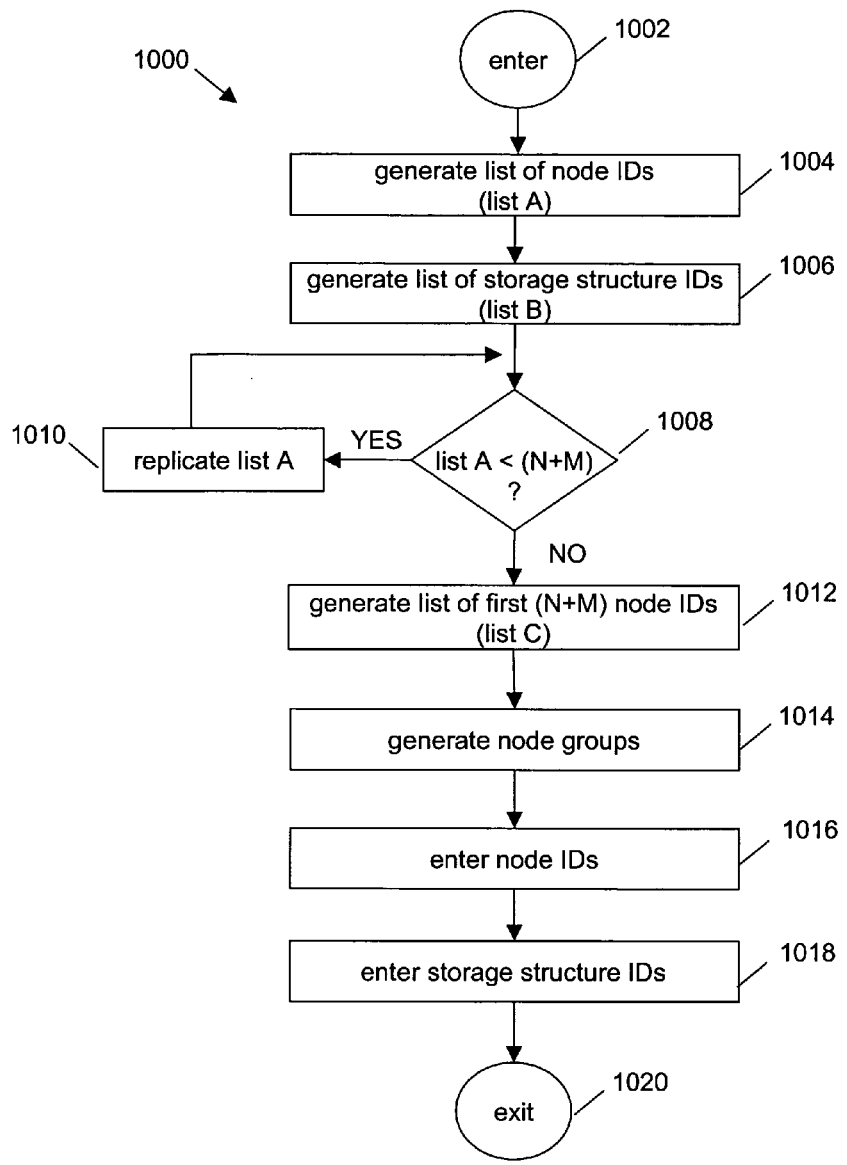
FIG. 10 illustrates a process flow diagram of a method for generating a layout map for a data object in accordance with one embodiment of the invention.

FIG. 10 illustrates a process flow diagram of a method 1000 for generating a layout map for a data object in accordance with one embodiment of the invention. Herein method 1000 is described with reference to generation of layout map 902, however, method 1000 is not limited to this example and other layout maps can be generated using method 1000 as further described herein. From an ENTER operation 1002, processing transitions to a GENERATE LIST OF NODE IDs operation 1004.

In GENERATE LIST OF NODE IDs operation 1004, node IDs of nodes 202A-202n in the cell, e.g., A, B, C, D, E, and F, are randomized to generate a randomly ordered list of node IDs, herein termed List A. Node IDs can be any identifier of a node 202A-202n used in storage system 200 so long no two nodes have the same node ID, for example, a network address.

In one embodiment, the layout map ID (determined in operation 104, FIG. 1) is used as a seed to a random or pseudo-random number generator (so that the sequence is reproducible) to generate List A, for example:

List A: D A F E C B.

Thus, the size of List A is the total number of nodes 202A-202n in the cell, e.g., 6. From GENERATE LIST OF NODE IDs operation 1004, processing transitions to a GENERATE LIST OF STORAGE STRUCTURE IDs operation 1006.

In GENERATE LIST OF STORAGE STRUCTURE IDs operation 1006, disk IDs, e.g., positions of the disks per node, are randomized to generate a randomly ordered list of disk IDs, herein termed List B. In one embodiment, the layout map ID is used as a seed to a random or pseudo-random number generator (so that the sequence is reproducible) to generate List B, for example:

List B: 2 3 1 4.

Thus, the size of List B is the total number of storage structures 314, e.g., disks, per node. From GENERATE LIST OF STORAGE STRUCTURE IDs operation 1006, processing transitions to a LIST A LESS THAN (N+M) check operation 1008.

In LIST A LESS THAN (N+M) check operation 1008, a determination is made whether the total entries in the randomly ordered list of node IDs (List A) are less than the value of (N+M), e.g., the number of data object fragments per data object. When the randomly ordered list of node IDs (List A) is not less than the value of (N+M) ("NO"), from LIST A LESS THAN (N+M) check operation 1008, processing transitions to a GENERATE LIST OF FIRST (N+M) NODE IDs operation 1012.

As operation 1004 generated a List A of 6 nodes and the value of (N+M)=4, List A is not less than (N+M) ("NO"), and, processing transitions to GENERATE LIST OF FIRST (N+M) NODE IDs operation 1012.

Otherwise, when the total entries in List A are less than the value of (N+M) ("YES"), from LIST A LESS THAN (N+M) check operation 1008, processing transitions to a REPLICATE LIST A operation 1010.

In REPLICATE LIST A operation 1010, the randomly ordered list of node IDs (List A) is replicated (thus extending the entries of List A), and processing transitions to LIST A LESS THAN (N+M) check operation 1008 as described.

When the total entries in List A are not less than the value of (N+M) ("NO"), in GENERATE LIST OF FIRST (N+M) NODE IDs operation 1012, the first (N+M) node IDs are selected from List A in the order they appear in List A, to generate a List C. In the present example, selection of the first four (4) node IDs in order from List A produce List C, for example:

List C=D A F E.

From GENERATE LIST OF FIRST (N+M) NODE IDs operation 1012 processing transitions to a GENERATE NODE GROUPS operation 1014.

In GENERATE NODE GROUPS operation 1014, node groups are generated for each column of layout map 902.

In one embodiment, for each column of layout map 902, a ordered group of node IDs, herein termed a Node Group, are selected in the order of List C such that:

(a) the node ID at an index i of List C is first in a Node Group i, and (b) no node ID is selected twice before all the other node IDs are selected.

Further, the size of each Node Group i is limited to:

a minimum of (#nodes/(N+M)) for (#nodes)>=2(N+M), and a maximum of (#nodes/(N+M)) for (#nodes)<2(N+M).

Given (a) and (b) above, and the minimum and maximum node group size limits imposed above, no node ID appears more than twice when the number of nodes is less than 2(N+M), and no node groups share any nodes when the number of nodes is greater than or equal to 2(N+M).

In the present example, the number of node IDs in each node group is limited to a maximum of (6/4)=2 (rounded up to the closest integer). The number of node groups is 4 (operation 1012). The first 4 node IDs in List C are placed as the first node IDs in each of the node groups, D in Group 1, A in Group 2, F in Group 3, and E in Group 4.

The next node ID in list A (the next node ID in list A following the first (N+M) node IDs, node C, is placed as the second node ID in Group 1, and B as the second node ID in Group 2. As this exhausts List A, the remaining positions of Node Groups 3 and 4 are filled beginning from the start of List A, in order, thus, D is placed as the second node ID in Group 3, and A as the second node ID in Group 4. Thus, one example of a node group set is:

Node Group 1=DC
Node Group 2=AB
Node Group 3=FD
Node Group 4=EA, and from GENERATE NODE GROUPS operation 1014, processing transitions to an ENTER NODE IDs operation 1016.

In ENTER NODE IDs operation 1016, for each row in the matrix enter the corresponding node ID for each column (in order) beginning at the first node ID listed in Node Group 1 and iterating through the first node ID in each Node Group, e.g., 2, 3, and 4, and wrapping around to the beginning of Node Group 1 and continuing with the second node ID in Node Group 1, and iterating through the second node ID in each Node Group, e.g., 2, 3, and 4. If a selected node has been used as a node ID d times, where d is the number of storage structures 314, e.g., disks, per node (e.g., 4), the node is removed from all node groups. Thus, one example of the matrix with the node ID entered is:

| D | A | F | E  |
|---|---|---|----|
| C | B | D | A  |
| D | A | F | E  |
| C | B | D | A  |
| C | B | F | E  |
| C | B | F | E. |

Note that node D and node A were selected d times and thus were removed from the Node Groups 1 and 2, respectively, after selection d times. From ENTER NODE IDs operation 1016, processing transitions to an ENTER STORAGE STRUCTURE IDs operation 1018.

In ENTER STORAGE STRUCTURE IDs operation 1018, for each node ID, all matrix entries containing a node ID, for example, A, B, C, D, E, and F, are iterated through in order of appearance in the matrix (for example, beginning at matrix entry identified with storage structure 906 and proceeding across each row before advancing to the next row and proceeding across that row), and the disk IDs (the storage structure ID) in order of List B are entered with each node ID. Thus, layout map 902 represents an example of the resulting layout map, and processing transitions from ENTER STORAGE STRUCTURE IDs operation 1018 to an EXIT operation 1020, with processing exiting method 1000.

Figure 11:
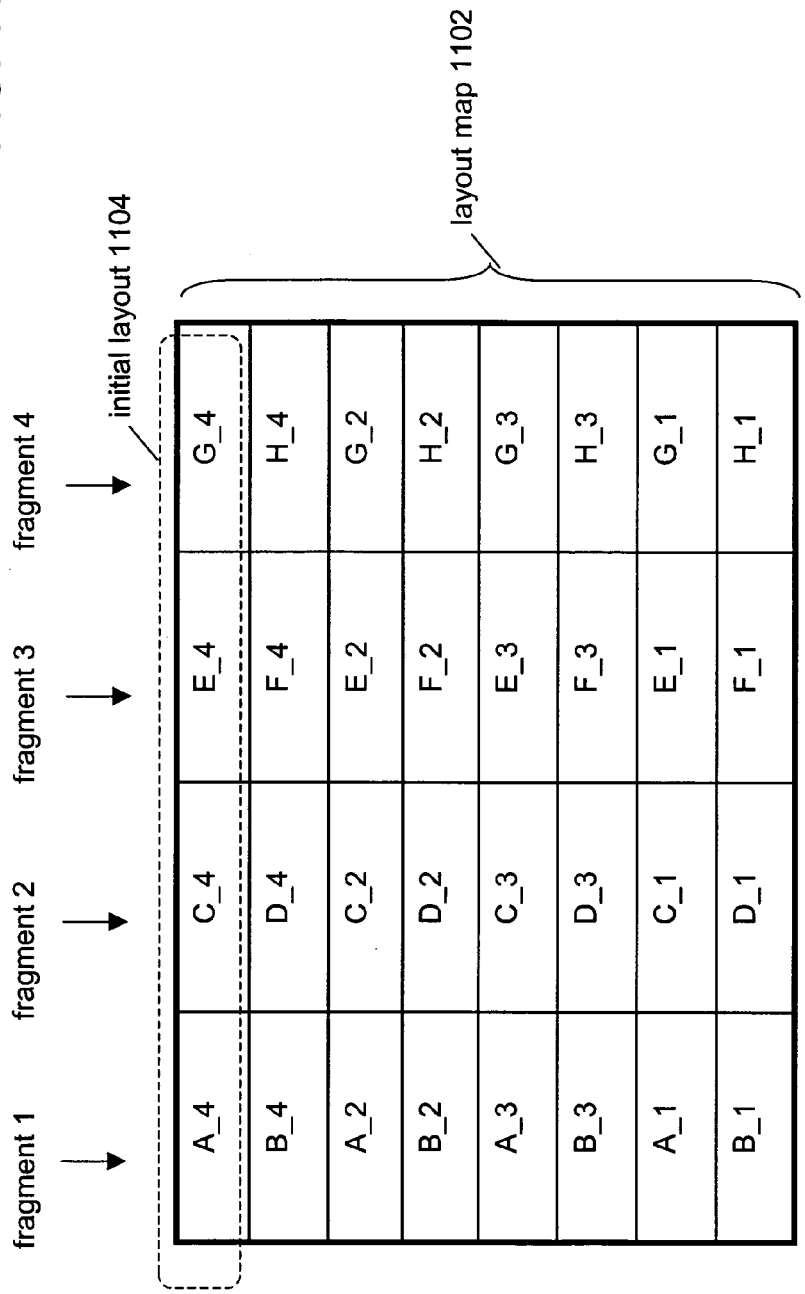
FIG. 11 illustrates an example of a layout map for a data object on a data storage system in which the number of nodes is not less than the value of 2(N+M) in accordance with one embodiment of the invention.

FIG. 9 illustrates an example in which the number of nodes is less than 2(N+M). FIG. 11 illustrates an example in which the number of nodes is not less than the value of 2(N+M), and the removal of nodes from an associated Node Group during operation 1016 as described with reference to FIG. 9 (due to the number of nodes being less than 2(N+M)) is not exhibited.

FIG. 11 illustrates an example of a layout map 1102 for a data object in which the number of nodes 202A-202n is not less than the value of 2(N+M) in accordance with the invention. In this further example, it is assumed that the number of nodes=8, e.g., nodes 202A-202H, and (N+M) =2+2 (or 4), i.e., the number of nodes=2(N+M), and each node has four storage structures 314, e.g., disks. The node IDs are denoted by the capital letters A, B, C, D, E, F, G and H and the storage structures 314, e.g., disks, on each node are denoted by the numbers 1, 2, 3, and 4, which also denote the positions of the disks. In this example, no nodes are removed from an associated Node Group.

Thus, following earlier described operations of method 1000, from ENTER operation 1002, processing transitions to GENERATE LIST OF NODE IDs operation 1004.

In GENERATE LIST OF NODE IDs operation 1004, a layout map ID (determined in operation 104, FIG. 1) is used as a seed to a random or pseudo-random number generator to generate List A, for example:

List A: A C E G B D F H, and processing transitions from GENERATE LIST OF NODE IDs operation 1004 to GENERATE LIST OF STORAGE STRUCTURE IDs operation 1006.

In GENERATE LIST OF STORAGE STRUCTURE IDs operation 1006, the layout map ID is used as a seed to a random or pseudo-random number generator to generate List B, for example:

List B: 4 2 3 1, and processing transitions from GENERATE LIST OF STORAGE STRUCTURE IDs operation 1006 to LIST A LESS THAN (N+M) check operation 1008.

In LIST A LESS THAN (N+M) check operation 1008, a determination is made whether List A is less than (N+M). As operation 1004 generated a list of 8 nodes and (N+M)=4, List A is not less than (N+M) ("NO"), and, processing transitions from LIST A LESS THAN (N+M) check operation 1008 to GENERATE LIST OF FIRST (N+M) NODE IDs operation 1012.

In GENERATE LIST OF FIRST (N+M) NODE IDs operation 1012, the first (N+M) nodes in List A are selected to generate List C. Thus, the first four (4) nodes are selected in order from List A to produce List C, for example:

List C=A C E G, and processing transitions to GENERATE NODE GROUPS operation 1014.

In GENERATE NODE GROUPS operation 1014, the number of nodes per group is limited to a minimum of (8/4)=2. Thus, one example of a node group set is:

Node Group 1=AB
Node Group 2=CD
Node Group 3=EF
Node Group 4=GH, and processing transitions from GENERATE NODE GROUPS operation 1014 to ENTER NODE IDs operation 1016.

In ENTER NODE IDs operation 1016, the node IDs are entered as earlier described, thus, one example of the matrix with the node IDs entered is:

| A | C | E | G |
|---|---|---|---|
| B | D | F | H |
| A | C | E | G |
| B | D | F | H |
| A | C | E | G |
| B | D | F | H |
| A | C | E | G |
| B | D | F | H, | and processing transitions from ENTER NODE IDs operation 1016 to ENTER STORAGE STRUCTURE IDs operation 1018.

In ENTER STORAGE STRUCTURE IDs operation 1018, the disk IDs are entered as earlier described, resulting in layout map 1102, and processing transitions from ENTER STORAGE STRUCTURE IDs operation 1018 to EXIT operation 1020 with processing exiting method 1000.

Utilizing method 1000 in the generation of layout maps, the same storage structure 314, e.g., disk, should not appear twice in a layout map, and the maximum number of columns that share a given node should not exceed two (2) for cells with less than 2(N+M) nodes, but greater or equal to (N+M) nodes, and is one (1) for larger cells. This minimizes the placement of more than one (1) data object fragment of a data object on the same node.

Further, method 1000 generates layout maps that tolerate at least F node failures without data corruptions, such that:

F<M, for (# nodes)<(N+M), and
F=xM, for (# nodes)>=x(N+M), where x>=1.

Additionally, the number of disk failures tolerated before losing any data objects is larger than M.

In the above descriptions of DETERMINE LAYOUT MAP operation 106, and in particular method 1000 (FIG. 10), the determination of layout maps is described as performed at each store of a data object; however, in another embodiment, layout maps for each layout map ID are initially generated and stored in layout module 804 based on the current global cell view published by the master node, and updated layout maps are generated when the current global cell view is changed by the master node.

Returning now to FIG. 1, upon determination of the layout map, in DETERMINE LAYOUT operation 108, layout module 804 determines the layout. Herein a layout is a selected set of storage structures 314, e.g., disks, in storage system 200 that is available for storage of data, e.g., operational. In the present embodiment, selection of a layout by a node 202A-202n, e.g., node 202A, is independent from all other nodes.

In one embodiment, layout module 804 reads the status, e.g., online or offline, of all storage structures 314, e.g., disks, in the cell from a disk mask maintained by disk mask module 802 and determines the layout for the selected layout map ID from the layout map and the disk mask.

In one embodiment, a disk mask is a set of Boolean values indicating which storage structures 314, e.g., disks, are currently operational in the cell. A disk mask has an entry for each storage structure 314, e.g., disk, that is potentially in the cell. Thus, the size of the disk mask is constant, although the values within the disk mask change when a storage structure 314, e.g., a disk, fails or comes back online.

In one embodiment, a storage structure 314, e.g., a disk, is indicated as failed in a disk mask based on a disk status indicator received from a disk driver, for example, received by node management module 412 (FIG. 4), and published on network 208 (FIG. 2). However, if a node 202A-202n is unresponsive, even after a configurable timeout, all storage structures 314, e.g., disks, on the node are treated as failed. In one embodiment, changes to the disk mask are made only after approval by the master node, for example, by update of the global cell view maintained by the master node.

In the present embodiment, each node 202A-202n computes the disk mask independently, thus, it is possible for nodes 202A-202n to generate slightly different disk masks for a very brief period of time. Although, the use of the disk mask can result in excessive recovery of a data object, for example, extra data object fragments, the extra data object fragments can later be collected, for example by a garbage collection mechanism when the disk mask views become consistent. For example, in one embodiment, a garbage collection mechanism removes extra data object fragments after verifying that the data object fragments have been reconstructed elsewhere, so that different disk maps across the cell do not result in the erroneous deletion of data.

In one embodiment, storage structures 314, e.g., disks, within storage system 200 are associated as index entries to a disk mask based on the disk positions within the cell. For example, disk 1 on node 202A can be at disk mask index 1, disk 2 on node 202A can be at disk index 2, and so on. This embodiment creates an ordering of nodes 202A-202n, and of storage structures 314, e.g., disks, on a node that persists across node reboots.

In one embodiment, writing an identifying header to the first sector of each storage structure 314, e.g., disk, can be used to accomplish storage structure ordering and also to detect if a physical storage structure 314 is manually relocated to a different position within the cell.

Referring again to FIG. 9 and layout map 902, if disks D_2, A_2, F_2 and E_2 (the first row), are available, they are chosen as the initial layout for a data object assigned layout map 902. Storage structures in the subsequent rows ordered in each column represent alternative placements for a data object fragment should a preceding storage structure become unavailable. Thus, for example, if storage structure 906, e.g., D_2, fails, in initial layout 904, the data object fragment, e.g., fragment 1, is placed in the next storage structure in alternative placements 906, e.g., C_2. If C_2 is unavailable, the data object fragment, e.g., fragment 1, is placed in D_1, and so forth.

In one embodiment, if a disk fails, for example, storage structure 906, e.g., disk D_2, node C automatically reconstructs the data object fragment, e.g., fragment 1, for all data objects that were assigned this layout map ID, on disk C_2. Similarly, if disk F_2 fails, node D will reconstruct the data object fragment, e.g., fragment 3, for all data objects that were assigned this layout map ID, on disk D_3.

Consequently, in the example of layout map 902, if recovery capacity is available, up to one half of the disks in the cell can be lost, non-concurrently, without losing data. Further, up to three nodes out of the six can be lost non-concurrently. Without recovery, only two nodes and two disks can be lost concurrently. Recovery of data objects is further described herein.

In one embodiment, if storage structure 906 in the first row comes back online, that data object fragment is reconstructed back onto storage structure 906. Thus, each column of layout map 902 predetermines the placement trajectory of a data object fragment as individual storage structures in that column fail or come back online. Thus, by using the layout map, the system metadata remains unchanged, i.e., the layout map ID remains unchanged, even when layouts of data objects change.

Similarly, referring to FIG. 11 and layout map 1102, if disks A_4, C_4, E_4, and G_4 (the first row), are available, they are chosen as the initial layout 1104 for a data object assigned layout map 1102. Storage structures in the subsequent rows ordered in each column represent alternative placements for a data object fragment should a preceding storage structure become unavailable.

Upon determination of a layout, layout module 804 returns the layout map ID and layout to object archive module 410, and processing transitions from DETERMINE LAYOUT operation 108 to a FRAGMENT DATA OBJECT operation 110.

In FRAGMENT DATA OBJECT 110, the data object is received by object archive module 410, for example, by streaming, and fragmented as earlier described with reference to method 500 and FIGS. 5 and 6. In particular, the data object is fragmented using erasure coding, such as Reed-Solomon erasure coding, to obtain (N+M) data object fragments that are associated with a unique object ID that is based upon an intrinsic parameter of the data object, such as the content.

In one embodiment, the data object fragments are ordered so that each data object fragment is separately identifiable from other data object fragments of the data object, for example, by assigning an ordered number to each data object fragment. For example, if a data object is fragmented into (N+M) fragments of (2+2), the data object fragments are ordered 1, 2, 3, and 4. Further, as earlier described, system metadata associated with the data object is generated during the fragmentation of the data object by object archive module 410. From FRAGMENT DATA OBJECT operation 110, processing transitions to a STORE DATA OBJECT operation 112.

In STORE DATA OBJECT operation 112, object archive 410 stores the data object fragments in accordance with the selected layout. In particular, object archive 410 stores the data object fragments in the storage structures 314 indicated in the layout determined in DETERMINE LAYOUT operation 108. In one embodiment, object archive module 410 stores at least a portion of the system metadata for a data object with each data object fragment.

In one embodiment, object archive module 410 also writes the layout map ID associated with the data object, e.g., the data object ID, to the data object's system metadata in metadata module 408. In one embodiment, object archive module 410 returns a confirmation of the storage indicating the object ID, for example, via interface module 404 to switch 110. In some embodiments, additional information, such as the layout map ID, are also included. From STORE DATA OBJECT operation 112, processing transitions to an EXIT operation 114, with processing exiting method 100.

Figure 12:
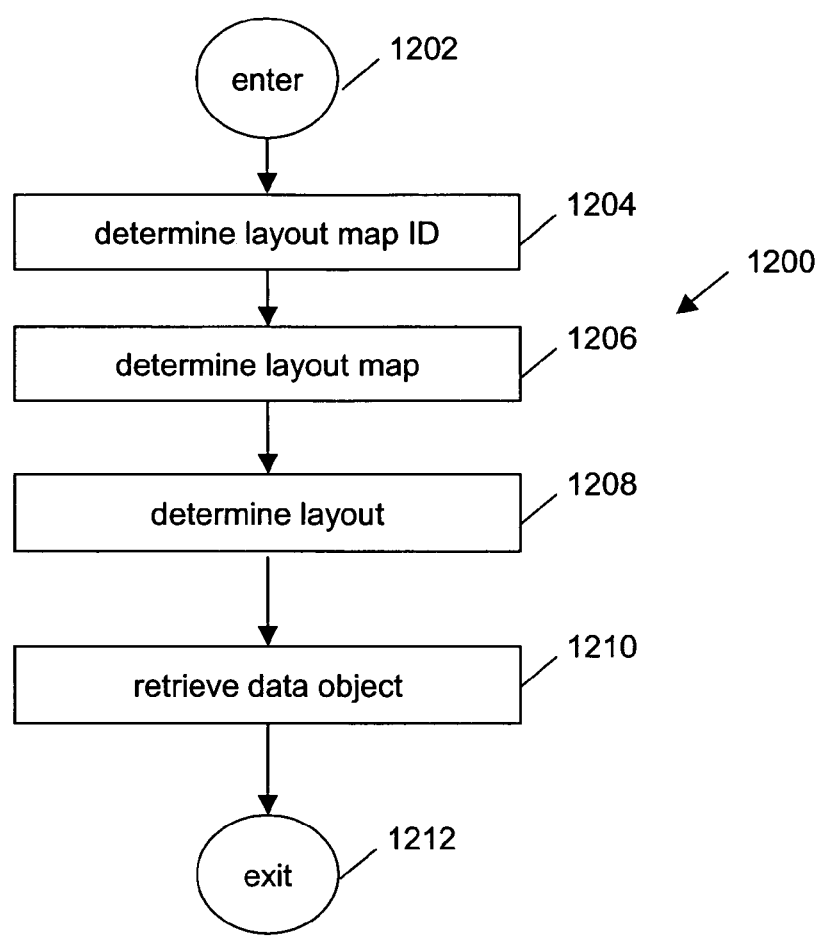
FIG. 12 illustrates a process flow diagram of method for retrieving a data object stored on a data storage system in accordance with one embodiment of the present invention.

As earlier described, utilization of method 100 permits efficient retrieval of data on storage system 200 as further described herein with reference to FIG. 12.

FIG. 12 illustrates a process flow diagram of method 1200 for retrieving data stored on a data storage system in accordance with one embodiment of the present invention. As illustrated in FIG. 12, in one embodiment, a request to retrieve, e.g., read, a data object is received at a node 202A-202n (FIG. 2), for example, at node 202A. In one embodiment, the request to retrieve includes the object ID of the data object. In the present embodiment, the request to retrieve a data object is communicated to symmetric storage application 204, and in particular to object archive module 410, for example, from interface module 404. Object archive module 410 initiates a retrieve and enters method 1200 from an ENTER operation 1202, and processing transitions to a DETERMINE LAYOUT MAP ID operation 1204.

In DETERMINE LAYOUT MAP ID operation 1204, object archive module 410 determines the layout map ID associated with the data object. In one embodiment, object archive module 410 requests the layout map ID from metadata module 408. Metadata module 408 locates the layout map ID associated with the data object from the indexed metadata. Metadata module 408 returns the layout map ID to object archive module 410, and from DETERMINE LAYOUT MAP ID operation 1204, processing transitions to a DETERMINE LAYOUT MAP operation 1206.

In DETERMINE LAYOUT MAP operation 1206, object archive module 410 requests the layout associated with the layout map ID from layout module 804. Layout module 804 reads the current disk mask from disk mask module 802 and determines the layout map associated with the layout map ID, and from DETERMINE LAYOUT MAP operation 1206, processing transitions to a DETERMINE LAYOUT operation 1208.

In DETERMINE LAYOUT operation 1208, layout module 804 determines the layout for the layout map ID based on the current disk mask and the layout map. Layout module 804 returns the layout to object archive module 410 and from DETERMINE LAYOUT operation 1208, processing transitions to a RETRIEVE DATA OBJECT operation 1210.

In RETRIEVE DATA OBJECT operation 1210, object archive module 410 retrieves the data object based on the layout, e.g., reads the data fragments from the locations on storage structures 314, e.g., disks, indicated in the layout, and assembles the data object. In one embodiment, any missing data fragments are reconstructed using other data and parity fragments and the erasure coding algorithm, e.g., the Reed-Solomon erasure coding algorithm. Object archive module 410 returns the data object, for example, via interface module 404 to switch 110, and processing transitions from RETRIEVE DATA OBJECT operation 1210 to an EXIT operation 1212, with processing exiting method 1200.

In some embodiments, the layout map ID is additionally included with the object ID in the request. In these embodiments, DETERMINE LAYOUT MAP ID operation 1204 is not performed.

In addition to efficiently storing and retrieving data objects, in one embodiment, storage system 200 permits recovery of data objects, such as when a storage structure 314, e.g., a disk, fails. In one embodiment, a recovery process is automatically initiated in storage system 200 each time a configured interval elapses or when the disk mask changes. In one embodiment, the initiation of the recovery process is selectable, for example, by a system administrator command, and the recovery process is automatically initiated unless the recovery process has not been selected, e.g., turned off.

In one embodiment, recovery module 806 of node 202A periodically polls disk mask module 802 to determine whether there has been a change to the disk mask maintained by disk mask module 802. When there has been a change, disk mask module 802 returns the updated disk mask to recovery module 806, and recovery module 806 automatically initiates a recovery process as further described with reference to FIG. 13 and method 1300.

In one embodiment, the recovery process can be started manually, or stopped in-progress, such as by a system administrator command. In one embodiment, the on/off and start/stop commands apply on a cell-wide level. In the present embodiment, if the disk mask changes while recovery is in progress, the recovery procedure is restarted.

In one embodiment, each node 202A-202n completes a recovery process independently from other nodes, thus, if a node 202A-202n fails during one of the operations of the recovery process, the node can simply start over from the beginning.

Figure 13:
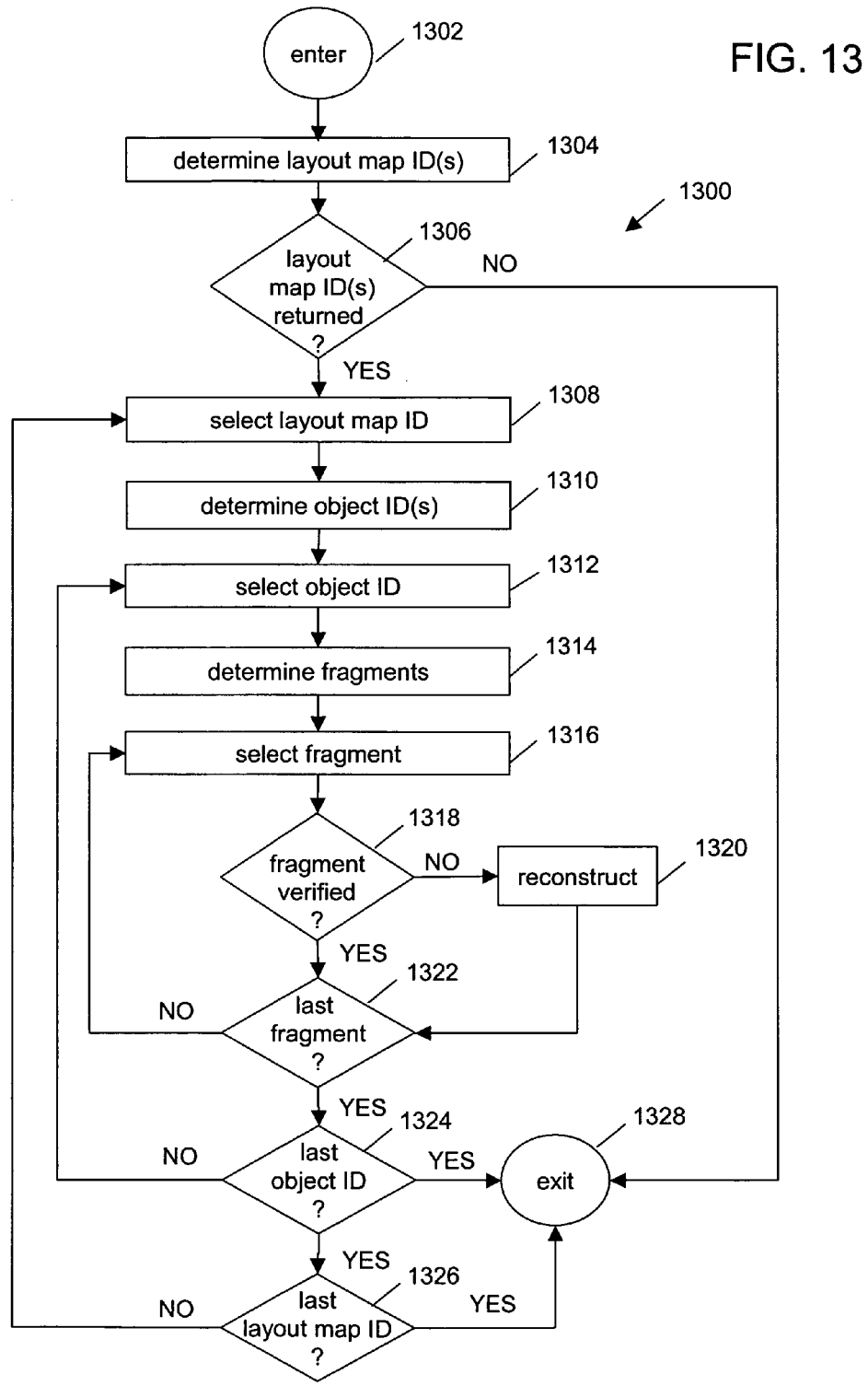
FIG. 13 illustrates a process flow diagram of a method for recovery of data objects on a data storage system in accordance with one embodiment of the invention.

FIG. 13 illustrates a process flow diagram of a method 1300 for recovery of data objects on a data storage system in accordance with one embodiment of the invention. For purposes of explanation, method 1300 is described as implemented on node 202A, however, in one embodiment, each of the nodes 202A-202n in the cell also performs method 1300.

As illustrated in FIG. 13, from an ENTER operation 1302, processing transitions to a DETERMINE LAYOUT MAP IDs operation 1304.

In DETERMINE LAYOUT MAP IDs operation 1304, recovery module 806 of node 202A determines the layout map IDs for data objects stored on the node, e.g., node 202A. In one embodiment, recovery module 806 requests the layout map IDs that place data object fragments on node 202A (given the current disk mask) from layout module 804.

Layout module 804 determines the layout map IDs of layout maps that place data object fragments on node 202A and returns a list of layout map IDs, if any, to recovery module 806. From DETERMINE LAYOUT MAP IDs operation 1304 processing transitions to LAYOUT MAP IDs RETURNED check operation 1306.

In LAYOUT MAP IDs RETURNED check operation 1306, recovery module 806 determines whether any layout map IDs are returned from layout module 804, for example by determining whether the number of layout map IDs returned from layout module 804 is greater than zero (0). If no layout map IDs are returned, for example the number of layout map IDs returned is not greater than zero (0), there are no data objects placed on node 202A to recover, and processing transitions from LAYOUT MAP IDs RETURNED check operation 1306 to an EXIT operation 1328 with processing exiting method 1300.

Otherwise, if recovery module 806 determines layout map IDs are returned from layout module 804, for example, the number of layout map IDs returned is greater than zero (0), processing transitions from LAYOUT MAP IDs RETURNED check operation 1306 to a SELECT LAYOUT MAP ID operation 1308.

In SELECT LAYOUT MAP ID operation 1308, recovery module 806 initially selects the first layout map ID in the returned list of layout map IDs, and processing transitions from SELECT LAYOUT MAP ID operation 1308, to a DETERMINE OBJECT IDs operation 1310.

In DETERMINE OBJECT IDs operation 1310, recovery module 806 queries metadata module 408 for object IDs of data objects which utilize the selected layout map ID. Metadata module 408 returns the list of object IDs with the associated layout map IDs, and from DETERMINE OBJECT IDs operation 1310, processing transitions to a SELECT OBJECT ID operation 1312.

In SELECT OBJECT ID operation 1312, recovery module 806 initially selects the first object ID in the list of object IDs returned for the selected layout map ID, and processing transitions to a DETERMINE FRAGMENTS operation 1314.

In DETERMINE FRAGMENTS operation 1314, recovery module 806 determines a list of the data object fragments placed on the node for the selected object ID based on the layout derived from the layout map ID (using the current disk mask). From DETERMINE FRAGMENTS operation 1314, processing transitions to a SELECT FRAGMENT operation 1316.

In SELECT FRAGMENT operation 1316, recovery module 806 initially selects a first data object fragment associated with the selected object ID, and that should reside on a disk on the node, for example, node 202A, and processing transitions from SELECT FRAGMENT operation 1316 to a FRAGMENT VERIFIED check operation 1318.

In FRAGMENT VERIFIED check operation 1318, recovery module 806 verifies that the selected data object fragment identified as placed on node 202A actually exists on the appropriate data storage structure 314, e.g., disk, on node 202A, for example, by scanning the appropriate data storage disk for the selected fragment. If the data object fragment is not verified ("NO"), processing transitions from FRAGMENT VERIFIED check operation 1318 to a RECONSTRUCT operation 1320. Otherwise, if the data object fragment is verified ("YES"), processing transitions from FRAGMENT VERIFIED check operation 1318 to a LAST FRAGMENT check operation 1322.

In RECONSTRUCT operation 1320, recovery module 806 requests object archive module 410 to reconstruct the missing data object fragment and to store the reconstructed data object fragment to the appropriate data storage location, e.g., disk, for example, in accordance with the current disk mask and the associated layout map ID. In one embodiment, object archive module 410 utilizes an inverse of the erasure coding algorithm used to store data objects, for example, Reed-Solomon erasure coding, together with at least some of the available data fragments and parity fragments located on storage system 200 to reconstruct the missing data object fragment. From RECONSTRUCT operation 1320, processing transitions to a LAST FRAGMENT check operation 1322.

In LAST FRAGMENT check operation 1322, recovery module 806 determines whether the last data object fragment that should be placed on the node, e.g., node 202A, for the selected object ID has been verified or reconstructed, e.g., if all the listed data object fragments for the selected object ID have been verified or reconstructed. If not ("NO"), processing transitions from LAST FRAGMENT check operation 1322 and returns to SELECT FRAGMENT operation 1316 earlier described (with selection of the next data object fragment in the list). Otherwise, if the last data object fragment for the selected object ID has been verified or reconstructed ("YES"), processing transitions from LAST FRAGMENT check operation 1322 to a LAST OBJECT ID check operation 1324.

In LAST OBJECT ID check operation 1324, recovery module 806 determines whether the last object ID on the list of object IDs for the selected layout map ID has been selected and processed in accordance with method 1300. If not ("NO"), processing transitions from LAST OBJECT ID check operation 1324 and returns to SELECT OBJECT ID operation 1312 earlier described (with selection of the next object ID in the list). Otherwise, if the last object ID for the selected layout map ID has been selected and processed in accordance with method 1300 ("YES"), processing transitions from LAST OBJECT ID check operation 1324 to a LAST LAYOUT MAP ID check operation 1326.

In LAST LAYOUT MAP ID check operation 1326, recovery module 806 determines whether the last layout map ID in the list of layout map IDs has been selected and processed in accordance with method 1300. If not ("NO"), processing transitions from LAST LAYOUT MAP ID check operation 1326 and returns to SELECT LAYOUT MAP ID operation 1308 (with selection of the next layout map ID in the list).

Otherwise, if the last layout map ID for node 202A returned from layout module 804 has been selected and processed in accordance with method 1300 ("YES"), recovery on node 202A is complete, and processing transitions from LAST LAYOUT MAP ID check operation 1326 to EXIT operation 1328, with processing exiting method 1300.

In one embodiment, as each node 202A-202n proceeds through the above operations, each node 202A-202n reports its recovery status, for example, by reporting the percentage of the layout map IDs (returned in operation 1304) that have been processed. When all nodes 202A-202n have completed method 1300 for the current disk mask, in one embodiment, a notification is provided, for example, to a system administrator, that recovery is complete, i.e., all (available) disks now contain the expected data object fragments based on the current disk mask and the layout map IDs used by each data object.

As described above, in one embodiment, method 1300 determines which data object fragments should be on a given node and recovers any missing data object fragments by reconstructing the data object fragments on the data storage system. In another embodiment of the invention, if new nodes become operational, intact data object fragments, rather than missing data object fragments, are moved between storage structures 314 to maintain a uniform distribution of data object fragments across operational storage structures 314 in storage system 200, herein termed rebalancing.

For example, in one embodiment, a rebalancing of data object fragments on storage system 200 occurs in response to a previously failed storage structure 314, e.g., a disk, resuming operation (coming back online), or in response to the addition of a new node to storage system 200. In one embodiment, data object fragments selected for rebalancing are reconstructed, e.g., recovered onto another storage structure 314 similar to recovery and reconstruction of data object fragments lost due to disk failure (method 1300). In an alternative embodiment, data object fragments selected for rebalancing are copied from an original location to a storage structure 314 to a new location on a storage structure 314 to avoid the need to utilize erasure coding in reconstructing the data object fragment as in method 1300. For example, in one embodiment, a previous disk mask is used to locate a data object fragment that is to be copied, e.g., rebalanced, from one storage structure 314 (a first storage structure) to another storage structure 314 (a second storage structure).

As described above, in one embodiment, a recovery process (method 1300) determines data object fragments that should be on a given node and recovers any missing data object fragments by reconstructing the data fragments. In some instances, data object fragments are detected on a node that are not accounted for during the recovery process, herein termed garbage fragments. An example of a garbage fragment is a duplicate data object fragment. Garbage fragments utilize storage space in storage system 200 that could be more efficiently used, e.g., used for storage. Thus, in accordance with the invention, in one embodiment, these garbage fragments are removed through a method of garbage collection.

In one embodiment, recovery module 806 notes any data object fragments on the node, e.g., node 202A, that are not accounted for during a recovery process (method 1300) and marks these unaccounted for data object fragments for garbage collection, e.g., as garbage fragments. Prior to deleting the garbage fragments, recovery module 806 determines whether the garbage fragments are reconstructed elsewhere on storage system 200.

In one embodiment, recovery module 806 obtains the current layout for a garbage fragment from layout module 804, for example, utilizing the object ID or layout map ID present as part of the metadata data of the garbage fragment (part of the metadata stored as part of the data object fragment marked for garbage collection). Recovery module 806 determines the current placement of the data object associated with the object ID on storage system 200 in accordance with the layout and verifies that a duplicate data object fragment exists on the expected storage structure 314 (FIG. 3).

If recovery module 806 verifies the existence of a duplicate data object fragment on the expected storage structure 314 (FIG. 3), the garbage fragment is removed, e.g., deleted. Otherwise, the garbage fragment is not removed, and is not marked for garbage collection. One embodiment of a method of garbage collection is further described herein with reference to FIG. 14 and method 1400.

FIG. 14 illustrates a process flow diagram of a method 1400 for garbage collection of garbage fragments on a data storage system in accordance with one embodiment of the invention. For purposes of explanation, method 1400 is described as implemented on node 202A, however, in one embodiment, each of nodes 202A-202n independently performs method 1400.

In the present embodiment, method 1400 is described as implemented by symmetric storage system application 204. In the present embodiment, method 1400 is described as implemented by recovery module 806 of symmetric storage system application 204, however, in other embodiments, method 1400 can be implemented by a separate module, such as a garbage collection module of symmetric storage system application 204. In still other embodiments, some or all of the operations of method 1400 can be implemented by different modules of symmetric storage system application 204.

In the present embodiment, method 1400 is performed on each active storage structure of a node, such as on each active disk 1-disk n of node 202A. In other embodiments, method 1400 is performed on one or more selected active storage structures of a node. Implementation of method 1400 can be on demand, scheduled, or upon occurrence of a specified event or events, such as following a recovery.

As illustrated in FIG. 14, from an ENTER operation 1402, processing transitions to a DETERMINE LAYOUT MAP IDs FOR GARBAGE COLLECTION operation 1404.

In DETERMINE LAYOUT MAP IDs FOR GARBAGE COLLECTION operation 1404, recovery module 806 of node 202A determines a listing of layout map IDs that do not place data fragments on a selected storage structure given the current disk mask, also termed the layout map IDs for garbage collection. Herein this listing of layout map IDS for garbage collection is termed a garbage collection list as data fragments associated with any of the listed layout map IDs should not be stored on the selected storage structure, i.e., are garbage fragments.

For example, in one embodiment, recovery module 806 requests the garbage collection list (given the current disk mask) for a selected storage structure, such as disk 1 of node 202A, from layout module 804. Layout module 804 determines the layout map IDs of layout maps that do not place data fragments on the specified storage structure (e.g., disk 1 of node 202A) given the current disk mask and returns the garbage collection list, if any, to recovery module 806. From DETERMINE LAYOUT MAP IDs FOR GARBAGE COLLECTION operation 1404 processing transitions to a LAYOUT MAP IDs RETURNED check operation 1406.

In LAYOUT MAP IDs RETURNED check operation 1406, recovery module 806 determines whether any layout map IDs for garbage collection are returned from layout module 804. For example, in one embodiment, recovery module 806 determines whether the number of layout map IDs for garbage collection returned from layout module 804 is greater than zero (0). If no layout map IDs for garbage collection are returned ("NO"), for example the number of layout map IDs for garbage collection returned in the garbage collection list is not greater than zero (0), processing transitions from LAYOUT MAP IDs RETURNED check operation 1406 to an EXIT operation 1420 with processing exiting method 1400.

Alternatively, if recovery module 806 determines layout map IDs for garbage collection are returned from layout module 804, for example, the number of layout map IDs for garbage collection in the garbage collection list is greater than zero (0) ("YES"), processing transitions from LAYOUT MAP IDs RETURNED check operation 1406 to a SCAN operation 1408.

In SCAN operation 1408, recovery module 806 initially scans the selected storage structure 314 (e.g., disk 1 of node 202A) for data fragments. Scanning a disk to locate data is well-known to those of skill in the art and is not further described herein to avoid detracting from the description of the present invention. From SCAN operation 1408, processing transitions to a LOCATE FRAGMENT check operation 1410.

In LOCATE FRAGMENT check operation 1412, recovery module 806 determines whether a data fragment is located during the scan. If a data fragment is not located on the selected storage structure (e.g., not located on disk 1 of node 202A), there is no data fragment to evaluate for garbage collection, and processing transitions from LOCATE FRAGMENT check operation 1410 to EXIT operation 1420 with processing exiting method 1400.

Alternatively, if a data fragment is located on the selected storage structure (e.g., is located at a first location on disk 1 of node 202A), processing transitions from LOCATE FRAGMENT check operation 1410, to a DETERMINE LAYOUT MAP ID OF FRAGMENT operation 1412.

In DETERMINE LAYOUT MAP ID OF FRAGMENT operation 1412, recovery module 806 determines the layout map ID associated with the data fragment. In embodiments in which the layout map ID is part of the object ID of the data fragment, the layout map ID is obtained from the object ID stored with the data fragment. In other embodiments, in which the layout map ID is not part of the object ID of the data fragment, but can be associated with the object ID of the data fragment, recovery module 806 initiates queries to obtain the corresponding layout map ID, for example, to object archive module 402 or metadata module 408, to determine the corresponding layout map ID. FROM DETERMINE LAYOUT MAP ID OF FRAGMENT operation 1412, processing transitions to a MATCH check operation 1414.

In MATCH check operation 1414, recovery module 806 determines whether the layout map ID of the data fragment matches one of the layout map IDs of the garbage collection list. If the layout map ID of the data fragment does not match one of the layout map IDs of the garbage collection list, the data fragment is not assumed to be a garbage fragment, and processing transitions from MATCH check operation 1414 to a SCAN COMPLETE check operation 1422.

In SCAN COMPLETE check operation 1422, recovery module 806 determines whether the scan of the storage structure 314 is complete (e.g., whether the scanning of disk 1 of node 202A is complete). If the scan is not complete, processing transitions from SCAN COMPLETE check operation 1422 and returns to SCAN operation 1408, in which scanning is continued, for example, following the data fragment located at the first location in operation 1410).

Otherwise, if the scan is complete (e.g., the scan of disk 1 of node 202A is complete), processing transitions from SCAN COMPLETE check operation 1422, to EXIT operation 1420, with processing exiting method 1400.

Referring again to MATCH check operation 1414, alternatively, if the layout map ID of the data fragment matches one of the layout map IDs of the garbage collection list, the data fragment is tentatively assumed to be a garbage fragment (e.g., the data fragment is a candidate for deletion). From MATCH check operation 1414, processing transitions to a FRAGMENT VERIFIED check operation 1416.

In FRAGMENT VERIFIED check operation 1416, recovery module 806 initiates a query to determine whether the data fragment tentatively assumed to be a garbage fragment in operation 1414 is correctly stored at second location on system 200. In one embodiment, recovery module 806 determines a location where the data fragment should be located on system 200 given the current disk mask and the layout map ID of the data fragment, herein termed the disk mask location (i.e., a second location).

Recovery module 806 determines whether the data fragment is actually stored at the disk mask location on system 200. In one embodiment, recovery module 806 initiates a query to the node containing the disk mask location, for example, node 202B. In one embodiment, recovery module 806 queries node 202B via network 208 to verify the presence of the data fragment at the disk mask location. The responsible node (e.g., node 202B) returns a verification or a non-verification to recovery module 806 as to the presence of the data fragment at the disk mask location.

If the fragment is not verified at the disk mask location ("NO"), processing transitions from FRAGMENT VERIFIED check operation 1416, to SCAN complete check operation 1422, as earlier described. In this instance, although the data fragment is present on system 200 at a location not in accordance with the present disk mask, i.e., the first location, neither is present at the disk mask location on system 200, i.e., the second location. Thus, rather than risk the possibility of losing the data fragment from system 200, the data fragment is maintained on system 200.

Alternatively, if the data fragment is verified at the disk mask location ("YES"), the data fragment is present on data storage system 200 in at least two locations, the first location and at the disk mask location (i.e., the second location). Thus, the data fragment located at the first location is determined to be a garbage fragment. From FRAGMENT VERIFIED check operation 1416, processing transitions to a DELETE FRAGMENT operation 1418.

In DELETE FRAGMENT operation 1418, the data fragment located at the first location is deleted from data storage system 200 (e.g., deleted from the first location on disk one of node 202A). In one embodiment, the data fragment is deleted by overwriting the fragment and/or removing references to that data fragment on data storage system 200, or by otherwise making available to system 200 the memory space allocated to the garbage fragment at the first location. From DELETE FRAGMENT operation 1418, processing transitions to SCAN COMPLETE check operation 1422 as earlier described.

Although the above embodiment has been described with reference to a single storage structure of a node, in other embodiments, method 1400 is implemented on all operational (e.g., active) storage structures of a node. In one embodiment, method 1400 is implemented, either serially (e.g., sequentially) or in parallel, on all the operational storage structures (e.g., disk 1-disk n) of a node. In one embodiment, each node 202A-202*n* independently implements method 1400 on each operational storage structure of its locally attached storage structure.

In one embodiment, each node 202A-202*n* reports its garbage collection status, for example, by reporting the percentage of the locally attached storage that has been scanned or processed in accordance with method 1400. When all nodes 202A-202*n* have completed method 1400, in one embodiment, a notification is provided, for example, to a system administrator, that garbage collection is complete.

Thus, in accordance with the invention, there has been described a method for garbage collection of data fragments in a data storage system (method 1400), such as data storage system 200. A listing of layout map IDs that do not place data fragments on a selected storage structure given the current disk mask is determined (i.e., the garbage collection list). The selected storage structure is scanned for data fragments. When a data fragment is located, the layout map ID of the data fragment is determined. If the layout map ID of the data fragment matches a layout map ID in the garbage collection list, the data object fragment is tentatively assumed to be a garbage fragment pending a verification that the data object fragment exists on system 200 at a disk mask location. If the data fragment is verified as present on data storage system 200 at a disk mask location, the data fragment is determined to be a garbage fragment and is deleted. Data fragments having layout map IDs not matching a layout map ID in the garbage collection list or that cannot be verified are not assumed to be garbage fragments and are not deleted.

In one embodiment, symmetric storage system application 204 of data storage system 200 can be configured as a computer program product. Herein a computer program product comprises a medium configured to store computer-readable instructions, such as program code for symmetric storage system application 204, including all, any, or parts of processes described herein with reference to FIGS. 1-14, or in which computer-readable instructions for symmetric storage system application 204, including all, any, or parts of processes described herein with reference to FIGS. 1-14 are stored. Some examples of computer program products are CD-ROM discs, ROM cards, floppy discs, magnetic tapes, computer hard drives, servers on a network representing stored computer-readable instructions. Further herein, a means for performing a particular function is accomplished using the appropriate computer-readable instructions and the related hardware necessary to perform the function.

The foregoing description of implementations of the invention have been presented for purposes of illustration and description only, and, therefore, are not exhaustive and do not limit the invention to the precise forms disclosed. Modifications and variations are possible in light of the above teachings or can be acquired from practicing the invention. Consequently, Applicants do not wish to be limited to the specific embodiments shown for illustrative purposes.

What is claimed is:

1. A method comprising:
   determining a garbage collection list for a data storage structure of a node in a data storage system, said garbage collection list including one or more layout map identifiers (IDs) for garbage collection;
   locating a data fragment stored on said data storage structure at a first location;
   determining a layout map ID associated with said data fragment;
   determining whether said layout map ID associated with said data fragment matches a layout map ID for garbage collection in said garbage collection list;
   upon a determination that said layout map ID of said data fragment matches said layout map ID for garbage collection in said garbage collection list, determining whether said data fragment is present at a second location on said data storage system; and
   upon a determination that said data fragment is present at said second location on said data storage system, removing said data fragment at said first location.

2. The method of claim 1, wherein said locating a data fragment stored on said data storage structure of said node at a first location comprises:
   scanning said data storage structure; and
   detecting said data fragment at said first location.

3. The method of claim 1, wherein said second location is a disk mask location.

4. The method of claim 1, wherein upon a upon a determination that said layout map ID associated with said data fragment does not match said layout map ID for garbage collection in said garbage collection list, not removing said data fragment at said first location.

5. The method of claim 4, further comprising:
   determining whether scanning said data storage structure is complete; and
   upon a determination that scanning said data storage structure is not complete, continuing said scanning.

6. The method of claim 1, wherein upon a determination that said data fragment is not present at said second location on said data storage system, not removing said data fragment at said first location.

7. A data storage system including one or more nodes, each of said one or more nodes including one or more data storage structures, said data storage system comprising:
   means for determining a garbage collection list for a data storage structure of a node in said data storage system, said garbage collection list including one or more layout map identifiers (IDs) for garbage collection;
   means for locating a data fragment stored on said data storage structure at a first location;
   means for determining a layout map ID associated with said data fragment;
   means for determining whether said layout map ID associated with said data fragment matches a layout map ID for garbage collection in said garbage collection list;
   means for determining whether said data fragment is present at a second location on said data storage system; and
   means for removing said data fragment at said first location.

8. The data storage system of claim 7, further comprising:
   means for scanning said data storage structure for said data fragment; and
   means for detecting said data fragment at said first location.

9. The data storage system of claim 7, wherein said second location is a disk mask location.

10. The data storage system of claim 7, further comprising:
    means for determining whether scanning said data storage structure is complete.

11. The data storage system of claim 7, further comprising:
    means for determining a current disk mask;
    means for determining at least one layout map ID for garbage collection.

12. A computer program product comprising computer-readable instructions embodied as computer readable code for a method comprising:
    determining a garbage collection list for a data storage structure of a node in a data storage system, said garbage collection list including one or more layout map identifiers (IDs) for garbage collection;
    locating a data fragment stored on said data storage structure at a first location;
    determining a layout map ID associated with said data fragment;
    determining whether said layout map ID associated with said data fragment matches a layout map ID for garbage collection in said garbage collection list;
    upon a determination that said layout map ID of said data fragment matches said layout map ID for garbage collection in said garbage collection list, determining whether said data fragment is present at a second location on said data storage system; and
    upon a determination that said data fragment is present at said second location on said data storage system, removing said data fragment at said first location.

13. The computer program product of claim 12, wherein said locating a data fragment stored on said data storage structure of said node at a first location comprises:
    scanning said data storage structure; and
    detecting said data fragment at said first location.

14. The computer program product of claim 12, wherein said second location is a disk mask location.

15. The computer program product of claim 12, wherein upon a upon a determination that said layout map ID associated with said data fragment does not match said layout map ID for garbage collection in said garbage collection list, not removing said data fragment at said first location.

16. The computer program product of claim 15, said method further comprising:
    determining whether scanning said data storage structure is complete; and
    upon a determination that scanning said data storage structure is not complete, continuing said scanning.

17. The computer program product of claim 12, wherein upon a determination that said data fragment is not present at said second location on said data storage system, not removing said data fragment at said first location.

* * * * *

UNITED STATES PATENT AND TRADEMARK OFFICE
CERTIFICATE OF CORRECTION

PATENT NO.         : 7,299,325 B1
APPLICATION NO.   : 11/212093
DATED              : November 20, 2007
INVENTOR(S)        : Waterhouse et al.

It is certified that error appears in the above-identified patent and that said Letters Patent is hereby corrected as shown below:

In Column 28, Line 57, Claim 4, following "wherein upon a", and prior to "determination", delete "upon a".

In Column 30, Line 26, Claim 15, following "upon a", and prior to "determination", delete "upon a".

Signed and Sealed this

First Day of April, 2008

JON W. DUDAS
*Director of the United States Patent and Trademark Office*